(12) United States Patent
Yamamoto et al.

(10) Patent No.: US 12,287,114 B2
(45) Date of Patent: Apr. 29, 2025

(54) AIR CIRCULATOR

(71) Applicant: Iris Ohyama Inc., Sendai (JP)

(72) Inventors: Hideki Yamamoto, Kakuda (JP); Kazuhito Fukumasu, Kakuda (JP); Hiroshi Ishikawa, Kakuda (JP)

(73) Assignee: Iris Ohyama Inc., Sendai (JP)

( * ) Notice: Subject to any disclaimer, the term of this patent is extended or adjusted under 35 U.S.C. 154(b) by 0 days.

(21) Appl. No.: 18/818,429

(22) Filed: Aug. 28, 2024

(65) Prior Publication Data

US 2024/0418398 A1 Dec. 19, 2024

Related U.S. Application Data

(62) Division of application No. 18/315,100, filed on May 10, 2023, now Pat. No. 12,104,821, which is a (Continued)

(30) Foreign Application Priority Data

Sep. 29, 2017 (JP) .................................. 2017-191401
Feb. 16, 2018 (JP) .................................. 2018-026445

(51) Int. Cl.
*F24F 13/08* (2006.01)
*F04D 25/06* (2006.01)
(Continued)

(52) U.S. Cl.
CPC ............ *F24F 13/082* (2013.01); *F04D 25/08* (2013.01); *F04D 25/105* (2013.01);
(Continued)

(58) Field of Classification Search
CPC ...... F04D 25/084; F04D 25/086; F04D 25/10; F04D 25/105; F04D 27/003; F04D 27/004
See application file for complete search history.

(56) References Cited

U.S. PATENT DOCUMENTS 2,100,994 A 11/1937 Cohen
4,856,968 A 8/1989 Armbruster
(Continued)

FOREIGN PATENT DOCUMENTS

CN 201916224 U 8/2011
CN 205064330 U 3/2016
(Continued)

OTHER PUBLICATIONS

Reference CN108603514 with translation (Year: 2018).*
(Continued)

*Primary Examiner* — Brian O Peters
(74) *Attorney, Agent, or Firm* — Studebaker Brackett PLLC

(57) ABSTRACT

An air circulator includes a blower unit having an airflow opening on a front side of the blower unit and a grill in the airflow opening, and a support unit that supports the blower unit. The grill has a plurality of airflow guide blades arranged in a spiral, and inner end portions of the airflow guide blades proximal to a center of the spiral of the plurality of airflow guide blades protrude from outer end portions of the airflow guide blades in an airflow direction. The blower unit includes a cover forming an outer panel of the blower unit and an air passage forming member provided inside the cover. A reinforcing rib is formed on an outer circumferential surface of the air passage forming member.

3 Claims, 23 Drawing Sheets

Related U.S. Application Data division of application No. 17/648,877, filed on Jan. 25, 2022, now Pat. No. 11,686,500, which is a division of application No. 17/081,882, filed on Oct. 27, 2020, now Pat. No. 11,402,120, which is a division of application No. 16/646,983, filed as application No. PCT/JP2018/035578 on Sep. 26, 2018, now Pat. No. 10,859,287.

(51) Int. Cl.
| | |
|---|---|
| *F04D 25/08* | (2006.01) |
| *F04D 25/10* | (2006.01) |
| *F04D 27/00* | (2006.01) |
| *F04D 29/52* | (2006.01) |
| *F04D 29/54* | (2006.01) |
| *F04D 29/70* | (2006.01) |
| *F24F 7/007* | (2006.01) |
| *F24F 13/20* | (2006.01) |

(52) U.S. Cl.
CPC ......... *F04D 27/004* (2013.01); *F04D 29/522* (2013.01); *F04D 29/54* (2013.01); *F04D 29/544* (2013.01); *F04D 29/545* (2013.01); *F04D 29/703* (2013.01); *F24F 7/007* (2013.01); *F24F 13/20* (2013.01); *F04D 25/0693* (2013.01); *F05D 2210/12* (2013.01); *F24F 2013/205* (2013.01); *F24F 2221/38* (2013.01)

(56) References Cited

U.S. PATENT DOCUMENTS

| | | | |
|---|---|---|---|
| 4,927,324 A | 5/1990 | Coup et al. | |
| D312,124 S | 11/1990 | Coup et al. | |
| D358,639 S | 5/1995 | Chiu | |
| D413,664 S | 9/1999 | Keller et al. | |
| 6,364,618 B1 | 4/2002 | Moreno | |
| 7,530,783 B1 | 5/2009 | Ediger | |
| D599,463 S | 9/2009 | Israel et al. | |
| D605,280 S | 12/2009 | Chen | |
| D608,437 S | 1/2010 | Wawoe et al. | |
| D621,025 S | 8/2010 | Peterson et al. | |
| D621,026 S | 8/2010 | Peterson et al. | |
| D645,952 S | 9/2011 | Peterson et al. | |
| D645,953 S | 9/2011 | Peterson et al. | |
| D688,368 S | 8/2013 | Ediger et al. | |
| D760,370 S | 6/2016 | Herbst | |
| 2011/0223016 A1 | 9/2011 | Ediger et al. | |
| 2014/0044558 A1 | 2/2014 | Morioka et al. | |
| 2019/0275455 A1 | 9/2019 | Choi et al. | |

FOREIGN PATENT DOCUMENTS

| | | | |
|---|---|---|---|
| CN | 206190559 U | | 5/2017 |
| CN | 106837832 A | | 6/2017 |
| CN | 206429441 U | | 8/2017 |
| CN | 108603514 | * | 9/2018 |
| CN | 108757495 | * | 11/2018 |
| JP | S62-133993 U | | 8/1987 |
| JP | S63-246496 A | | 10/1988 |
| JP | 2001-165088 A | | 6/2001 |
| JP | 2010-054084 A | | 3/2010 |
| JP | 2011-122550 A | | 6/2011 |
| JP | 3174033 U | | 3/2012 |
| JP | 2012-237238 A | | 12/2012 |
| JP | 2016-033344 A | | 3/2016 |
| JP | 2016-160882 A | | 9/2016 |
| JP | 2016-194275 A | | 11/2016 |
| JP | 2017-172364 A | | 9/2017 |
| KR | 20-2017-0002079 U | | 6/2017 |
| WO | 2016/045186 A1 | | 3/2016 |

OTHER PUBLICATIONS

Reference CN108757495 with translation (Year: 2018).*
International Search Report issued in PCT/JP2018/035578; mailed Oct. 30, 2018.
"Decision to Grant a Patent" Office Action issued in JP 2018-026445; mailed by the Japanese Patent Office on Jun. 5, 2018.
"Notice of Reasons for Refusal" Office Action issued in JP 2018-026445; mailed by the Japanese Patent Office on Apr. 3, 2018.
Vornado Air, LLC; 'VFAN MINI' Models: VFANMC & VFANMM Instruction Manual; Feb. 2017; pp. 1-16; https://www.vornado.com/wp-content/uploads/2017/02/VFAN-Mini.pdf.

* cited by examiner

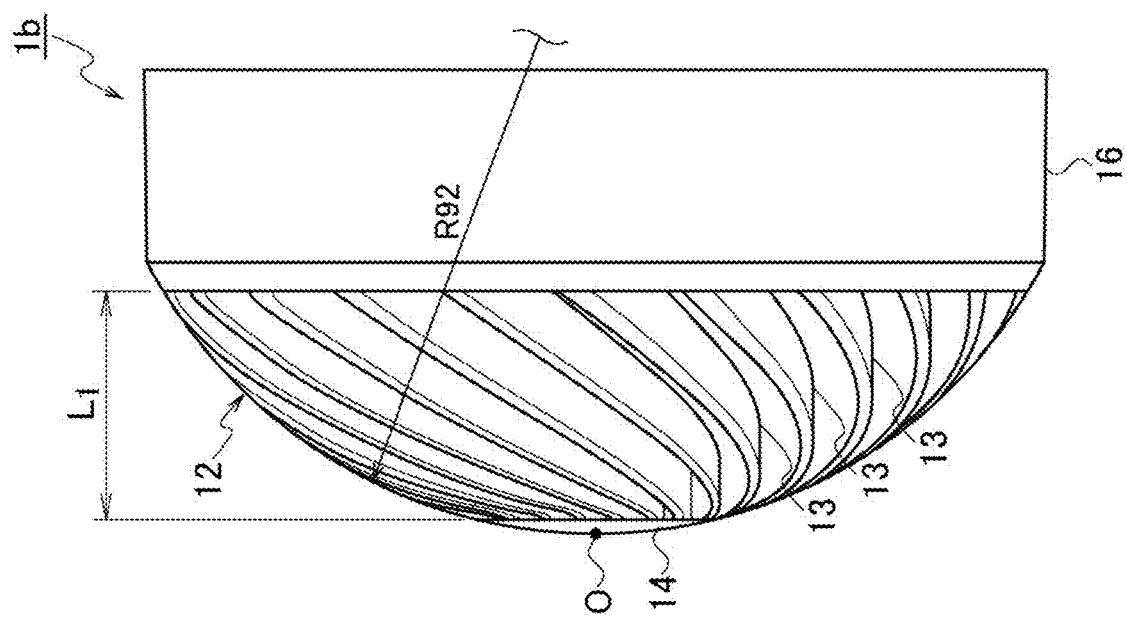
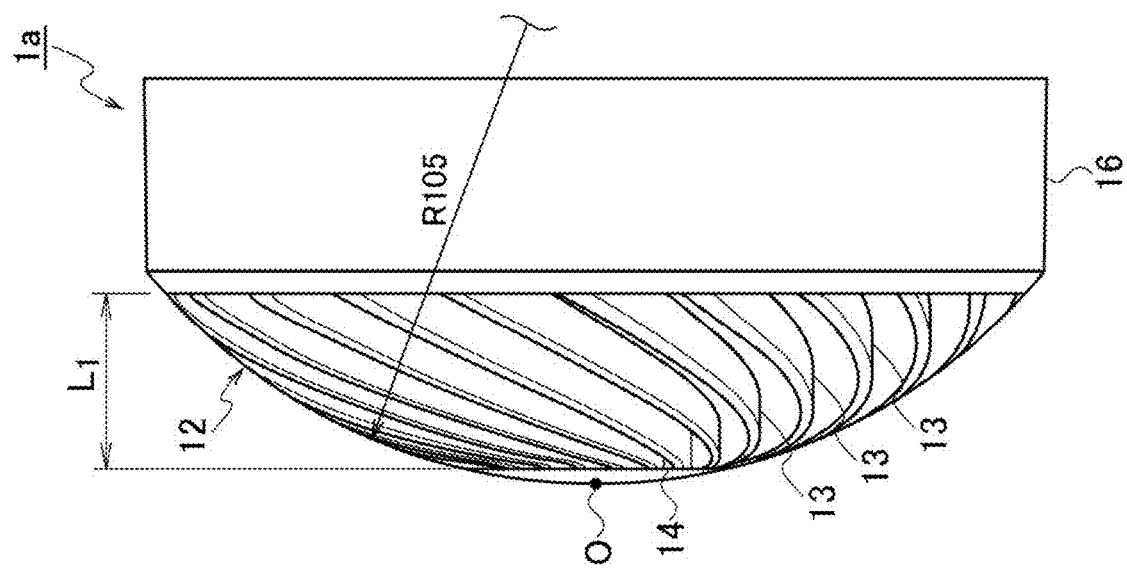

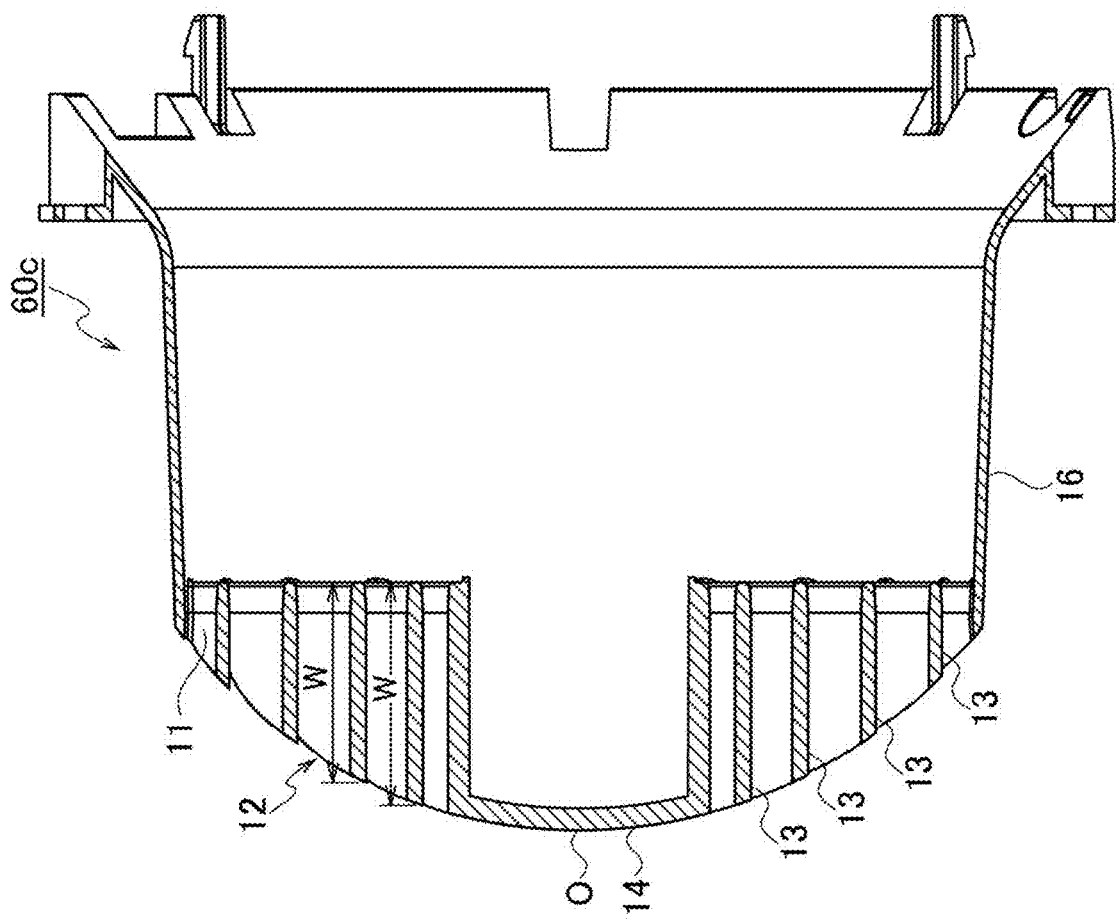
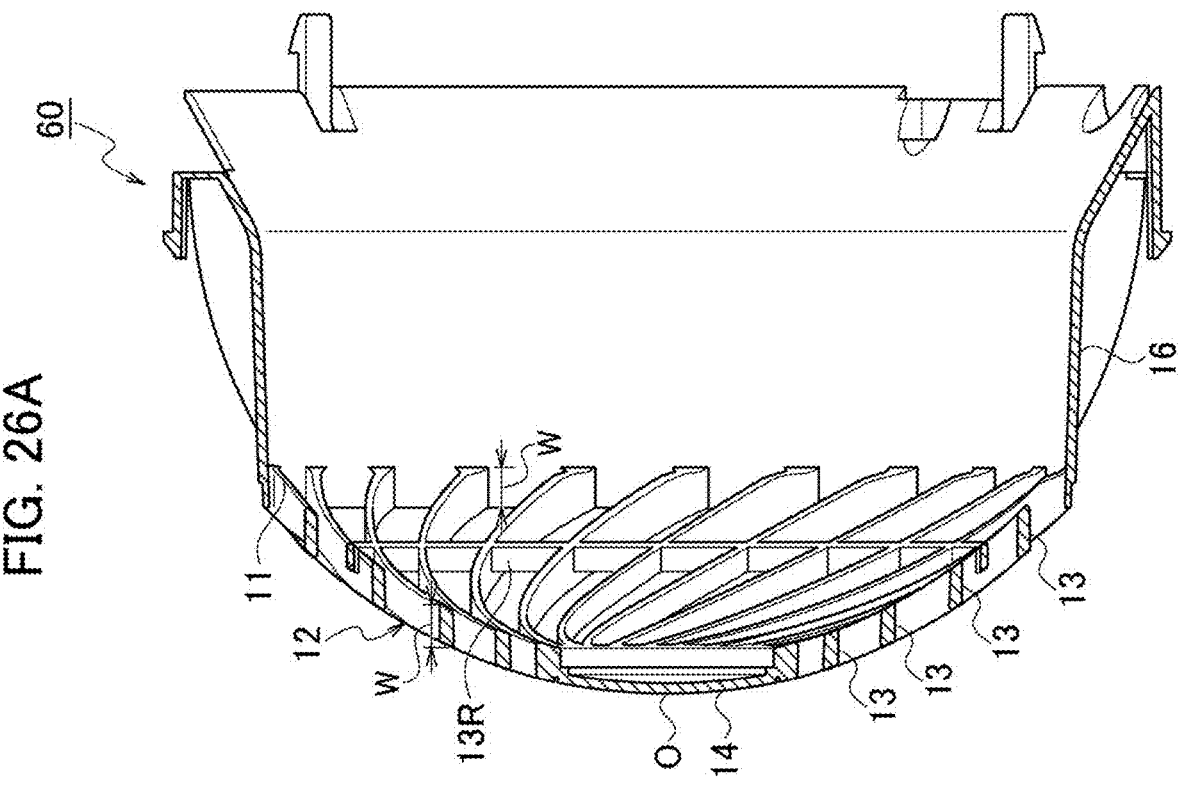

AIR CIRCULATOR

CROSS REFERENCE TO RELATED APPLICATIONS

This application is a divisional application of U.S. patent application Ser. No. 18/315,100. The U.S. patent application Ser. No. 18/315,100 is a divisional application of U.S. patent application Ser. No. 17/648,877. The U.S. patent application Ser. No. 17/648,877 is a divisional application of U.S. patent application Ser. No. 17/081,882. The U.S. patent application Ser. No. 17/081,882 is a divisional application of U.S. patent application Ser. No. 16/646,983, which is the national phase of the PCT application No. PCT/JP2018/035578 (Publication No. WO2019/065685) filed on Sep. 26, 2018, which is based upon and claims the benefit of priority from the prior Japanese Patent Application No. 2017-191401 (filing date: Sep. 29, 2017) and the prior Japanese Patent Application No. 2018-026445 (filing date: Feb. 16, 2018), and the entire contents of them are incorporated herein by reference.

BACKGROUND OF THE INVENTION

Technical Field

The present invention relates to an air circulator.

Background Arts

Heretofore, an air circulator having a grill provided with spiral fins (airflow guide blades) have been proposed (for example, see Japanese Patent Application Publication No. 2010-54084). By agitating air in a room by an air circulator to homogenize a temperature in the room, it becomes possible to improve cooling efficiency of an air-conditioner on summer season and thereby an energy-saving effect is expected, for example.

SUMMARY OF THE INVENTION

In a prior-art air circulator, its grill provided in its airflow opening has a flat planar structure, so that there is a problem that airflow is not directed to the center of its airflow direction and thereby a sufficient airflow speed cannot be got. If the airflow speed at the center of the airflow direction is insufficient, a reach distance of the airflow cannot extend and thereby there may be a case where air in a room cannot be agitated surely.

A present embodiment provides an air circulator that can agitate air in a room surely.

An aspect of the present embodiment provides an air circulator comprising: a blower unit having an airflow opening on a front side of the blower unit and a grill in the airflow opening; and a support unit that supports the blower unit, wherein the grill has a plurality of airflow guide blades arranged in a spiral, and inner end portions of the airflow guide blades proximal to a center of the spiral of the plurality of airflow guide blades protrude from outer end portions of the airflow guide blades in an airflow direction, wherein the blower unit includes a cover forming an outer panel of the blower unit and an air passage forming member provided inside the cover, and wherein a reinforcing rib is formed on an outer circumferential surface of the air passage forming member.

According to the present embodiment, it is possible to concentrate the airflow to the center of the airflow direction and to agitate air in a room surely.

BRIEF DESCRIPTION OF DRAWINGS

FIG. 9A is a right side view of a grill included in a blower according to a practical example 1;

FIG. 9B is a right side view of a grill included in a blower according to a practical example 2;

FIG. 26A is a cross-sectional view of a grill portion included in the air circulator according to the practical example 1; and FIG. 26B is a cross-sectional view of a grill portion included in a blower according to a modified example.

DESCRIPTION OF THE EMBODIMENTS

Figure 1:
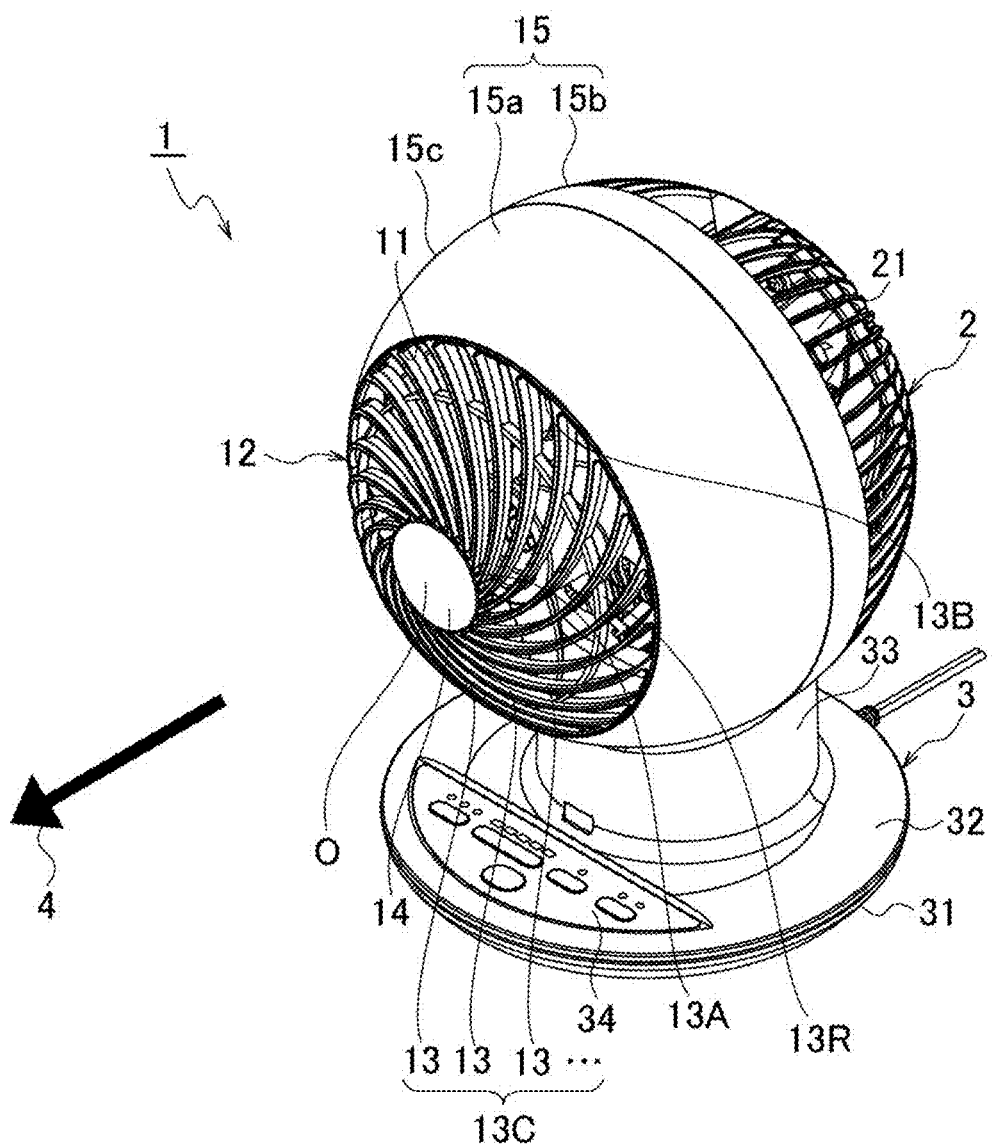
FIG. 1 is a perspective view of an air circulator according to the present embodiment.

Hereinafter, an embodiment of the present invention will be explained in detail with reference to the drawings. Note that identical or equivalent portions to each other are labelled with identical or equivalent signs to them in the drawings. However, it should be kept in mind that the drawings are schematic and relations between thickness and its planar dimension, proportions of thicknesses of layers and so on may be different from their actual ones. Therefore, specific thicknesses and dimensions should be understood in consideration of following explanations. In addition, of course, the drawings may include portions whose relations and proportions of dimensions are different from their actual ones.

Appearance

Figure 2:
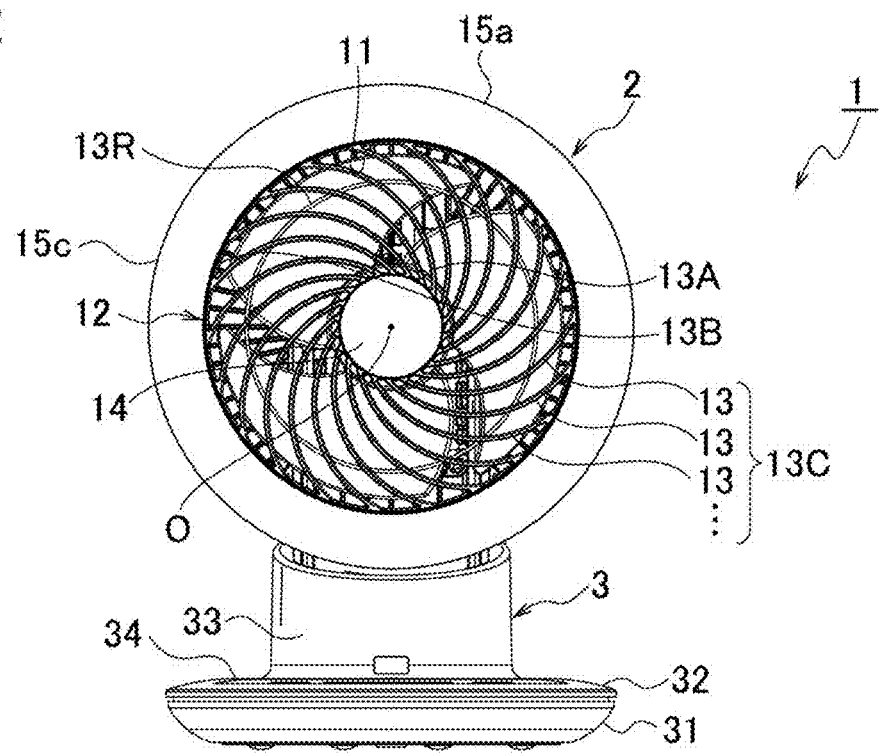
FIG. 2 is a front view of the air circulator according to the present embodiment.
Figure 3:
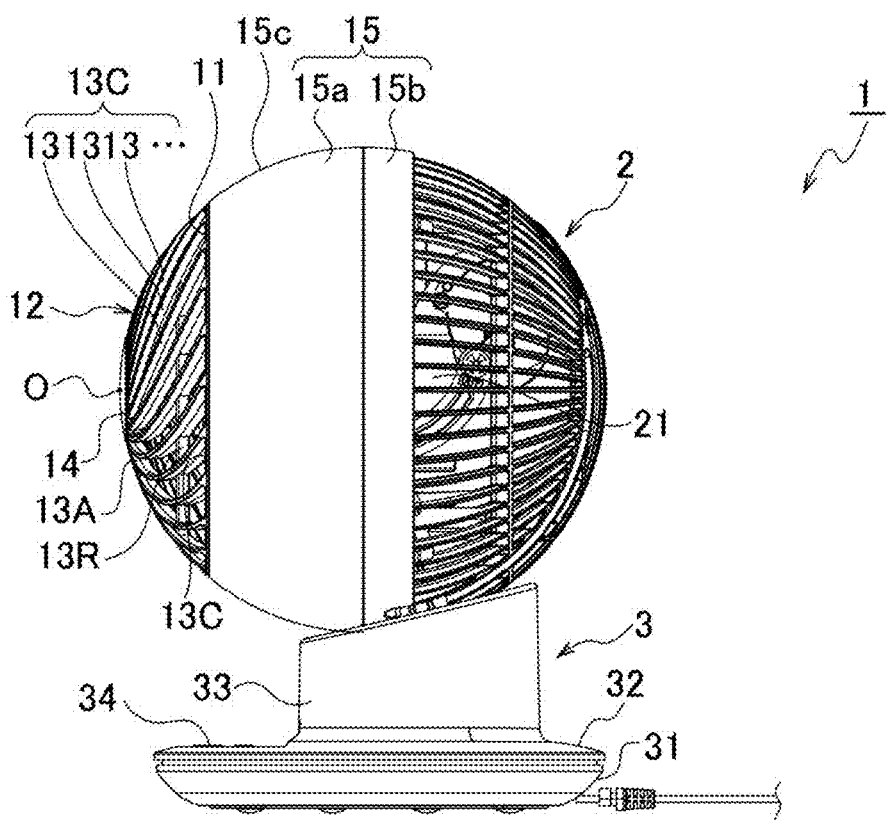
FIG. 3 is a right side view of the air circulator according to the present embodiment.
Figure 4:
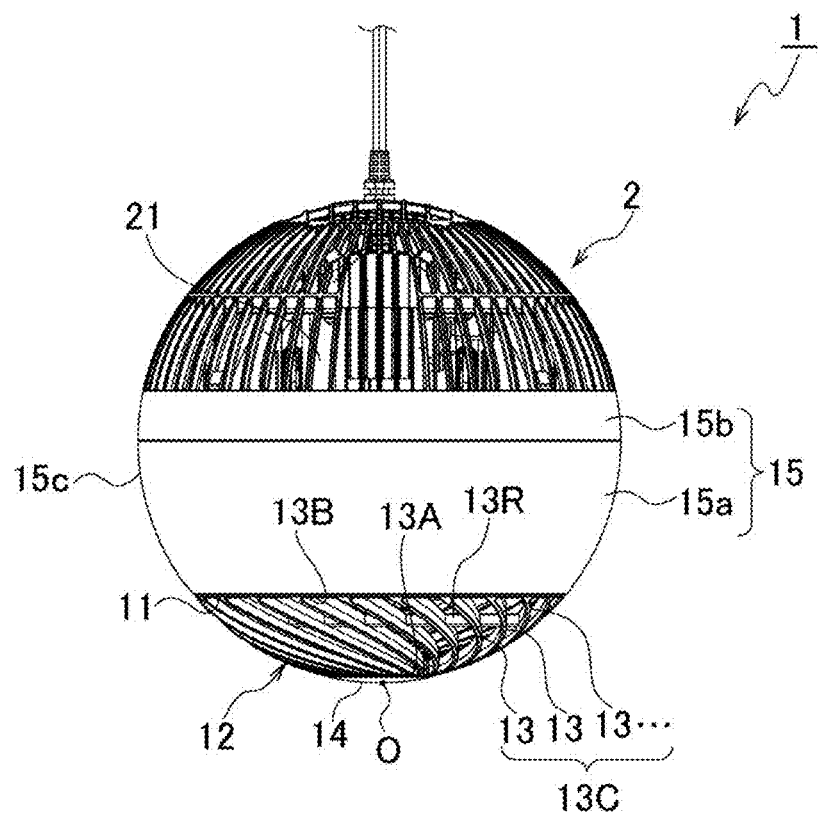
FIG. 4 is a plan view of the air circulator according to the present embodiment.
Figure 5:
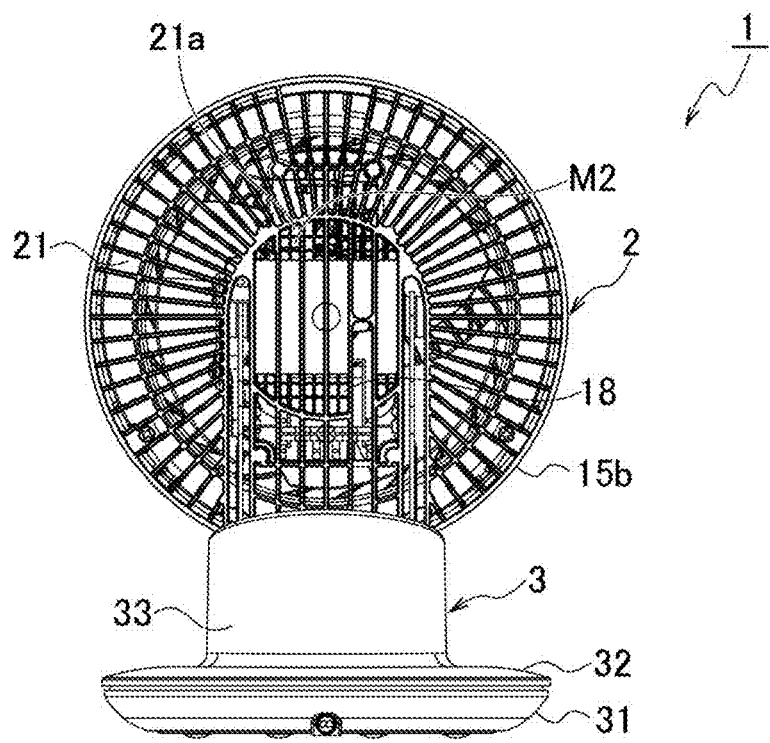
FIG. 5 is a back view of the air circulator according to the present embodiment.

FIG. 1 to FIG. 5 are appearance views showing a blower 1 according to the present embodiment, and FIG. 1 is its perspective view, FIG. 2 is its front view, FIG. 3 is its right side view, FIG. 4 is its plan view and FIG. 5 is its back view. This blower 1 intends to improve its airflow speed by its spherical grill structure, and is configured to be seen as being compact by its advanced spherical design.

Although it will be explained later in detail, as shown in FIG. 1 to FIG. 5, the air circulator 1 according to the present embodiment includes a blower unit 2 that is provided with an airflow opening 11 on its front side and in which a grill 12 is provided in the airflow opening 11, and a base unit (support unit) 3 that supports the blower unit 2, and the grill 12 is provided with plural fins (airflow guide blades) 13 in a spiral manner, and their inner end portions 13A proximal to the center O of the spiral of the plural fins 13 are protruded in an airflow direction 4 from their outer end portions 13B made continuous to the airflow opening 11. In other words, the inner end portions 13A are protruded in the airflow direction 4 with respect to the outer end portion(s) 13B of a portion 13C of the grill 12 in which the plural fins 13 are formed. The inner end portion(s) 13A is an inner-end side closer to the center O of the spiral and includes a vicinity of an inner end. The outer end portion(s) 13B is a portion of its outer-end side made continuous to the airflow opening 11. According to these, airflow is concentrated (made convergent) to the center, and thereby the airflow speed at the center of the airflow direction can be improved. In addition, a reach distance of the airflow (spiral airflow) blown out from the airflow opening 11 can be extended. As the result, air in a room can be agitated surely to homogenize a temperature in the room, and thereby it contributes to energy savings.

Figure 6:
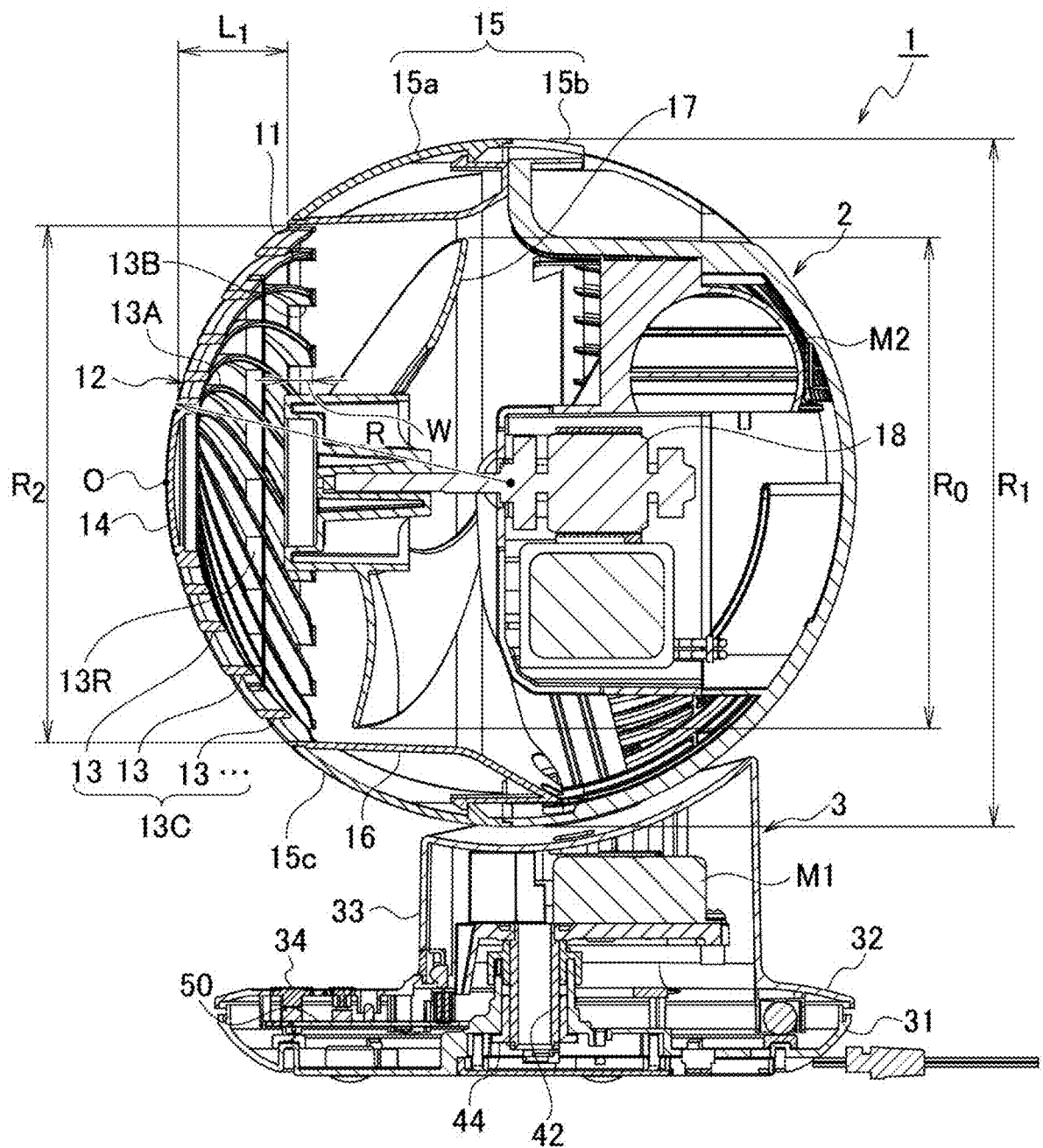
FIG. 6 is a cross-sectional view of the air circulator according to the present embodiment.

Specifically, as show in FIG. 6, it is preferable that a protrusion $L_1$ of the inner end portions 13A of the plural fins 13 with respect to the outer end portions 13B is set larger than a fin width W of the outer end portions 13B in a front-rear direction. The protrusion $L_1$ referred here corresponds to a distance in the front-rear direction from a front end of the outer end portions 13B to a front end of the inner end portions 13A. In addition, the fin width W is a width of the fins 13 in the front-rear direction. Here, the fins 13 whose fin width W is constant are shown as an example, and the outer end portions 13B of the said fins 13 are made continuous to the airflow opening 11. Note that the phrase "the protrusion of the inner end portions 13A of the plural fins 13 with respect to the outer end portions 13B" can be paraphrased as "the protrusion (of the inner end portions 13A with respect to the outer end portions 13B) of the portion 13C of the grill 12 in which the plural fins 13 are formed". The portion 13C in which the plural fins 13 are formed is a portion got by excluding a cap 14 on the center O of the spiral from the grill 12. According to this, the protrusion $L_1$ of the inner end portions 13A of the plural fins 13 with respect to the outer end portions 13B can be ensured sufficiently, and thereby an effect of concentrating airflow to the center can be brought surely.

In addition, it is preferable that the plural fins 13 (the portion 13C of the grill 12 in which the plural fins 13 are formed) are gradually protruded in the airflow direction 4 as they are directed from the outer end portions 13B to the center O of the spiral. According to this, the effect of concentrating the airflow to the center can be brought efficiently and thereby the airflow speed can be improved surely.

In addition, it is preferable that the plural fins 13 (the portion 13C of the grill 12 in which the plural fins 13 are formed) are curved so as to be convex in the airflow direction 4. According to this, the airflow speed can be improved more efficiently by forming the grill 12 convex (spherical).

In addition, the airflow opening 11 of the blower unit 2 is formed to have a circular shape and the protrusion $L_1$ of the inner end portions 13A of the plural fins 13 with respect to the outer end portions 13B is set larger than 20% of a diameter of the airflow opening 11. In other words, the inner end portions 13A of the portion 13C of the grill 12 in which the plural fins 13 are formed are protruded in the airflow direction 4 by more than 20% of the diameter of the airflow opening 11. According to this, the effect of concentrating the airflow to the center can be brought sufficiently and thereby the airflow speed can be improved surely.

In addition, it is preferable that the blower unit 2 has a cover 15 for forming its outer panel, and a hollow circular cylindrical airflow tunnel 16 provided inside the cover. According to this, the airflow speed of the airflow blown out from the airflow opening 11 can be made stable. The airflow blown out from an air circulator is a spiral airflow that flows forward while spiraling, and directionality and straightness of the airflow are higher than those of an electric cooling fan or the like. Such directionality and straightness of the airflow, which are specific effects by an air circulator, can be ensured by providing the air tunnel 16.

In addition, it is preferable that the cover 15 of the blower unit 2 has a front cover 15a having the grill 12 and a rear cover 15b capable of being coupled with the front cover 15a, and has a spherical shape in its coupled state where the front cover 15a and the rear cover 15b are coupled with each other. According to this, it has a sleek spherical shape and no sharp edge, and thereby looks compact. Further, its cute appearance and its fashionable look can be improved.

In addition, it is preferable that each of the front cover 15a and the rear cover 15b is formed to have a hemispherical shape so as to form a spherical shape in the coupled state, and an air passage forming member 60 having the air tunnel 16 is provided inside the front cover 15a, and a part of the air passage forming member 60 is protruded rearward from the front cover 15a. According to this, even in a case of having a spherical shape in their coupled state, a length of the air passage forming member 60 can be ensured.

In addition, it is preferable that the air passage forming member 60 has the circular hollow cylindrical airflow tunnel 16, and a radially-expanded hollow cylindrical portion that extended from a rear end of the airflow tunnel 16 and whose diameter is made gradually larger as it extends backwards. The radially-expanded hollow cylindrical portion will be explained later in detail. When the rear end of the air passage forming member 60 is made tapered in this manner, airflow from the rear can be guided smoothly. Further, the airflow speed increases while entering into the airflow tunnel 16 from the radially-expanded hollow cylindrical portion due to decrease of a flow passage area, and thereby it can contribute to the increase of the airflow speed.

Note that, as an example, here shown is a configuration in which a circular ring 13R intersecting with the fins 13 is provided in order to prevent fingers from being inserted through slits between the plural fins 13, 13 and to reinforce the grill 12, but this ring 13R is not necessarily provided.

Details of Each Element

Hereinafter, the air circulator 1 according to the present embodiment will be explained further in detail by using FIG. 1 to FIG. 5.

As already explained, the cover 15 of the blower unit 2 has the front cover 15a and the rear cover 15b. The front cover 15a is a hemispherical cover made of synthetic plastic material such as polypropylene, and the spherical grill 12 is provided in its airflow opening 11 opened at its front. The rear cover 15b is also a hemispherical cover made of synthetic plastic material such as polypropylene. Many air-through openings 21 for taking in external air are formed on almost an entire surface of the rear cover 15b.

The grill 12 is a front panel formed of synthetic plastic material having high impact resistance, for example. Specifically, it is formed such that the spiral fins 13 are made convex so as to protrude gradually as they are directed to the center O of the spiral. When air is sent from behind of the grill 12 and the airflow (wind) passes through the grill 12 in the front-rear direction, a spiral airflow that flows forward while spiraling is generated.

The base unit 3 supports the blower unit 2 left-light swingably, and lied on a placement surface. The base unit 3 has a base lower portion 31 formed to have a circular shape in its plan view, and a base upper portion 32 capable of being coupled with the base lower portion 31. With respect to both of the base lower portion 31 and the base upper portion 32, each cover forming an outer panel can be formed of synthetic plastic material such as polypropylene. A single-foot shaped support post 33 is raised posteriorly from the center of the base upper portion 32, and a control panel 34 is disposed anteriorly from the support post 33. Here, the base unit 3 is exemplified as a support unit 3, but the support unit 3 may has a structure enabling its installation on a ceiling.

Internal Structure

FIG. 6 is a cross-sectional view of the air circulator 1 according to the present embodiment. As shown in this figure, the blower unit 2 is a blower device for generating airflow, and includes a fan 17 for generating airflow and a motor 18 for driving the fan 17. An axial-flow type propeller fan is adopted as the fan 17 for generating the airflow in order to generate a large volume rate of the airflow. In addition, a general AC capacitor motor is adopted as the motor 18 for the fan 17. Note that a diameter $R_0$ of the fan 17 is almost 120 mm to 240 mm.

The air circulator 1 according to the present embodiment uses a motor M1 for left-right swinging and a motor M2 for up-down swinging in order to perform the left-right swinging and the up-down swinging automatically. Since these two motors M1 and M2 for the swinging are required to be small in size in order to accommodate them in the product, synchronous motors are adopted for them. Here, the left-right swinging and the up-down swinging are automatically operated, but it is not limited to this. For example, only the left-right swinging may be operated automatically.

Convex (Spherical) Grill Structure

Hereinafter, a spherical grill structure included in the air circulator 1 according to the present embodiment will be explained in detail. Following explanations will be made while comparing a comparative example (flat grill structure) with practical examples 1 and 2 (spherical grill structure) in order to clarify features of the spherical grill structure.

Comparative Example

Figure 7:
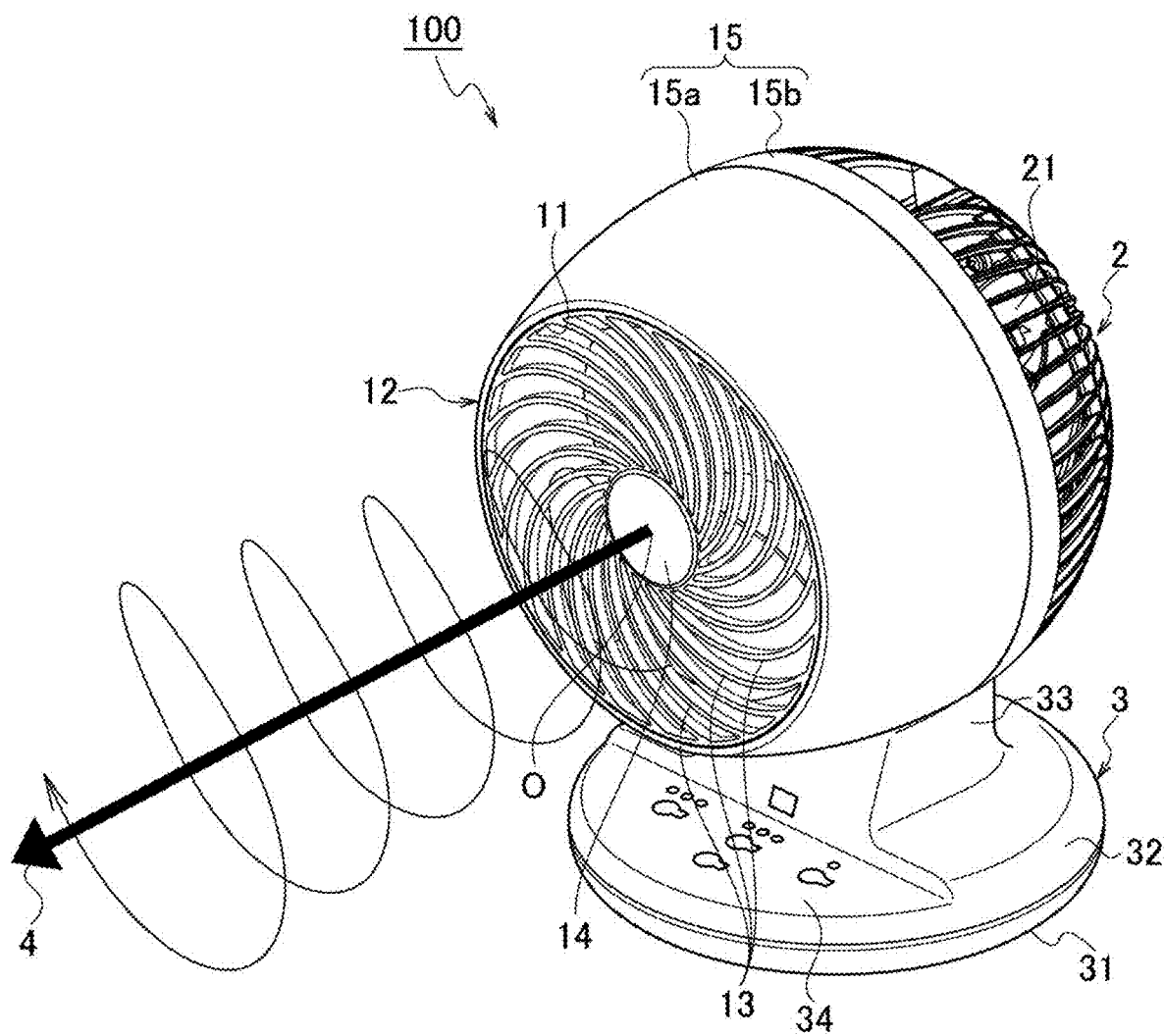
FIG. 7 is a perspective view of a blower according to a comparative example.

FIG. 7 is a perspective view of a blower 100 according to the comparative example. Identical or equivalent portions to those show in FIG. 1 are labelled with identical or equivalent signs to them. As show in FIG. 7, the air circulator 100 according to the comparative example is an air circulator provided with a flat grill structure. Namely, it includes a blower unit 2 whose outline shape is formed to have a barrel shape, and a flat grill 12 is provided in a circular airflow opening 11 opened toward its front. Similarly, this flat grill 12 also has plural fins 13 in a spiral manner. A portion of its front cover 15a excluding the grill 12 is formed to have a circular truncated cone shape slightly rounded.

Practical Examples 1 and 2

Figure 8:
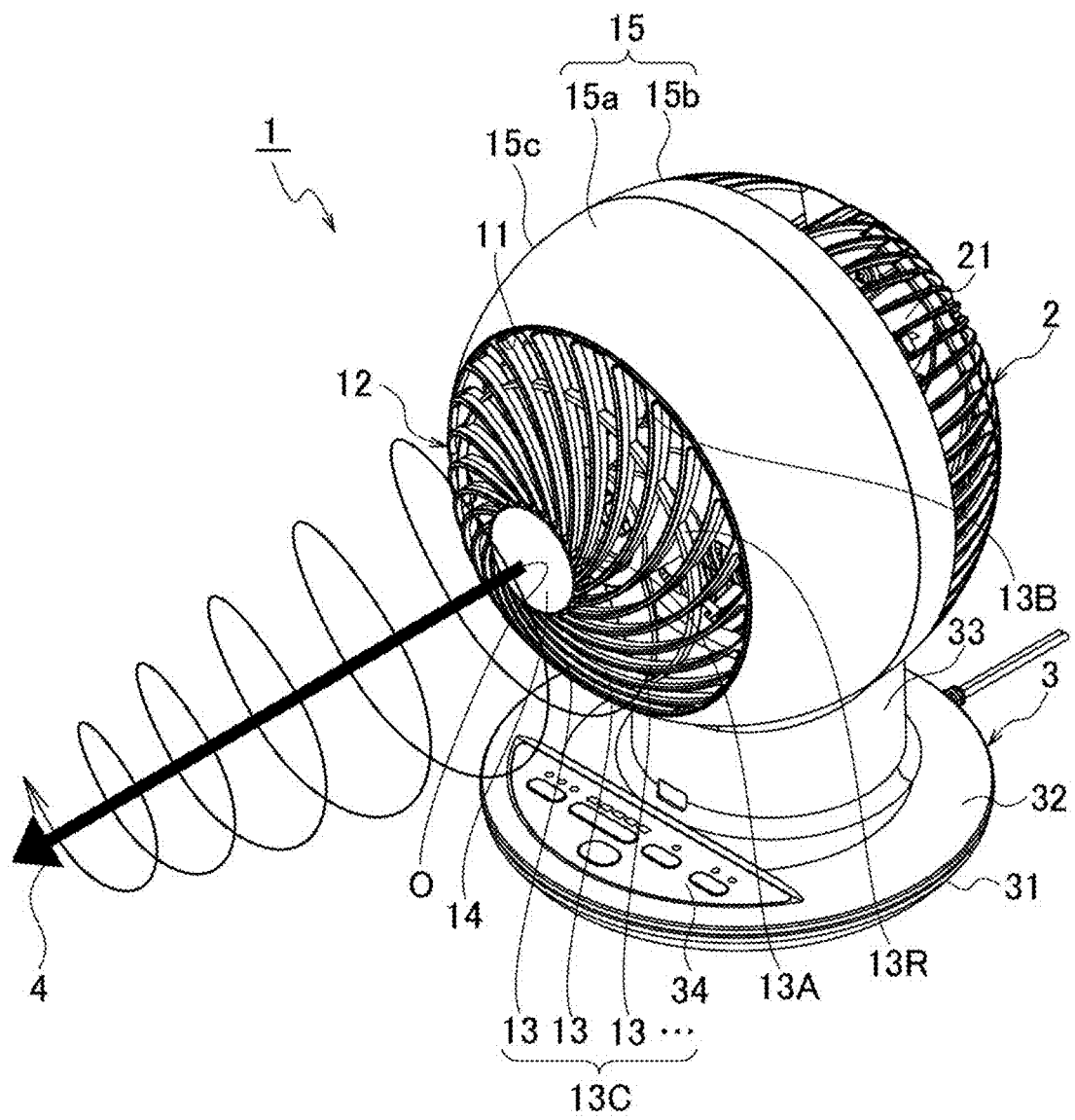
FIG. 8 is a perspective view showing a blowing state of the air circulator according to the present embodiment.

FIG. 8 shows a perspective view showing a blowing state of the air circulator 1 according to the present embodiment. As show in FIG. 8, the air circulator 1 according to the present embodiment is an air circulator provided with a spherical grill structure. Therefore, a turning force is applied to the airflow blown forward from the grill 12 so as to form a spiral convergent to the center of the airflow direction 4. As the result, the airflow is made convergent to the center, and thereby the airflow speed at the center of the airflow direction 4 can be improved. Hereinafter, a blower 1a according to the practical example 1 and a blower 1b according to the practical example 2 will be further explained in detail as concrete examples of the air circulator 1 according to the present embodiment.

FIG. 9A is a right side view of a portion of the grill 12 included in the air circulator 1a according to the practical example 1, and FIG. 9B is a right side view of a portion of the grill 12 included in the air circulator 1b according to the practical example 2. As shown in FIG. 9A, in the air circulator 1a according to the practical example 1, a curvature radius R of the grill 12 is about 105 mm in a case where a diameter $R_0$ of the fan 17 is about 150 mm, for example. On the other hand, as shown in FIG. 9B, in the air circulator 1b according to the practical example 2, a curvature radius R of the grill 12 is about 92 mm, for example. Fundamental structures of the air circulators 1a and 1b according to the practical example 1 and 2 are identical to each other with the exception that the curvature radii of their grills 12 are different from each other. For example, both of the air circulator 1a according to the practical example 1 and the air circulator 1b according to the practical example 2 have an identical feature in which the front ends of the inner end portions 13A is protruded with respect to the front ends of the outer end portions 13B.

Figure 10A:
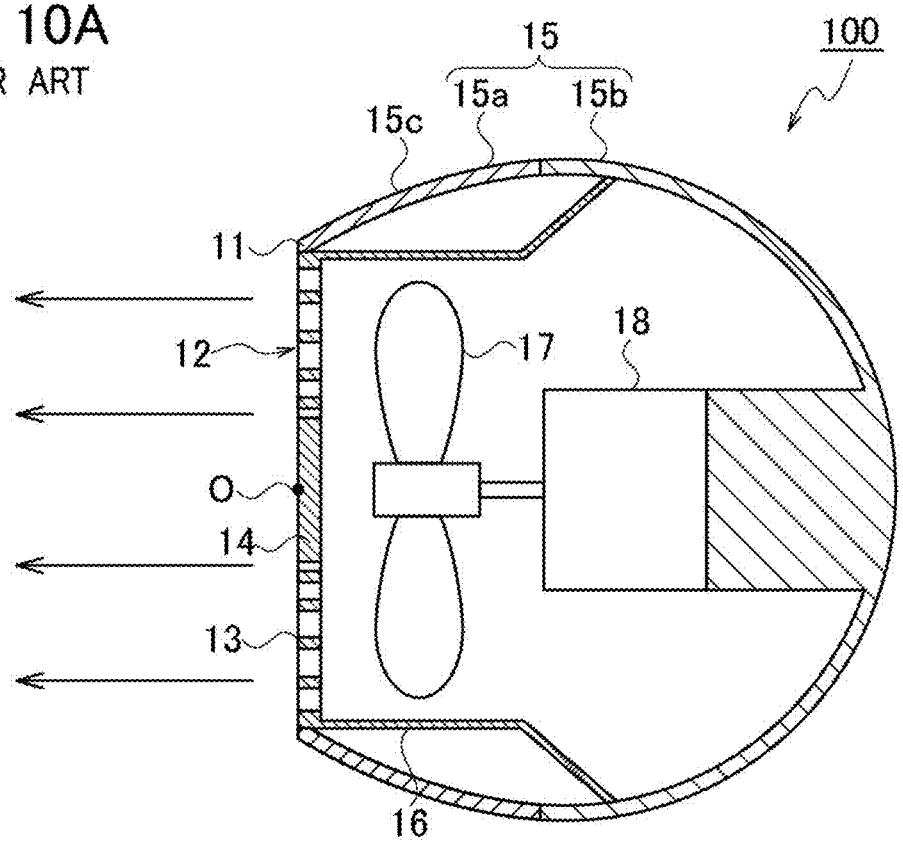
FIG. 10A is a cross-sectional end face view of a featured portion of the air circulator according to the comparative example.
Figure 10B:
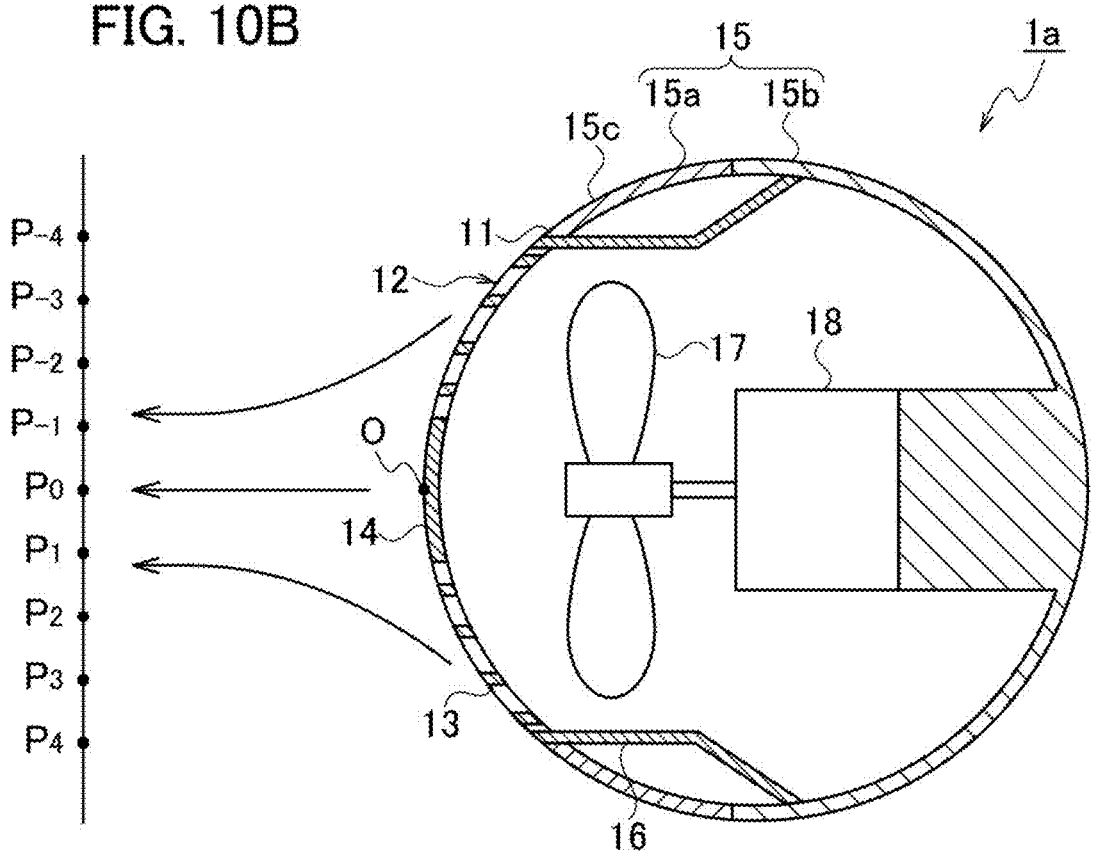
FIG. 10B is a cross-sectional end face view of a featured portion of the air circulator according to the practical example 1.

Next, operational differences among the comparative example and the practical examples 1 and 2 will be explained. FIG. 10A is a cross-sectional end face view of a featured portion of the air circulator 100 according to the comparative example, and FIG. 10B is a cross-sectional end face view of a featured portion of the air circulator 1a according to the practical example 1. Arrows in the drawings show the airflow blown out from the airflow openings 11. As shown in FIG. 10A, by the air circulator 100 according to the comparative example, the plural spiral fins 13 are arranged on the single flat plane, so that the airflow is hardly made convergent to the center of the airflow direction 4. On the other hand, as shown in FIG. 10B, by the air circulator 1a according to the practical example 1, the plural spiral fins 13 are arranged three-dimensionally, so that the airflow is readily made convergent to the center of the airflow direction 4. Although the air circulator 1a according to the practical example 1 is explained here, the same feature that the airflow is readily made convergent to the center of the airflow direction 4 can be brought also by the air circulator 1b according to the practical example 2. Note that the phrase "the center of the airflow direction 4" can be rephrased as "in front of the center of the airflow opening 11" or "on an extended line of a straight line that is parallel to the rotational axis of the fan 17 and passes through the center O of the spiral".

Comparison of Airflow Speeds

Figure 11:
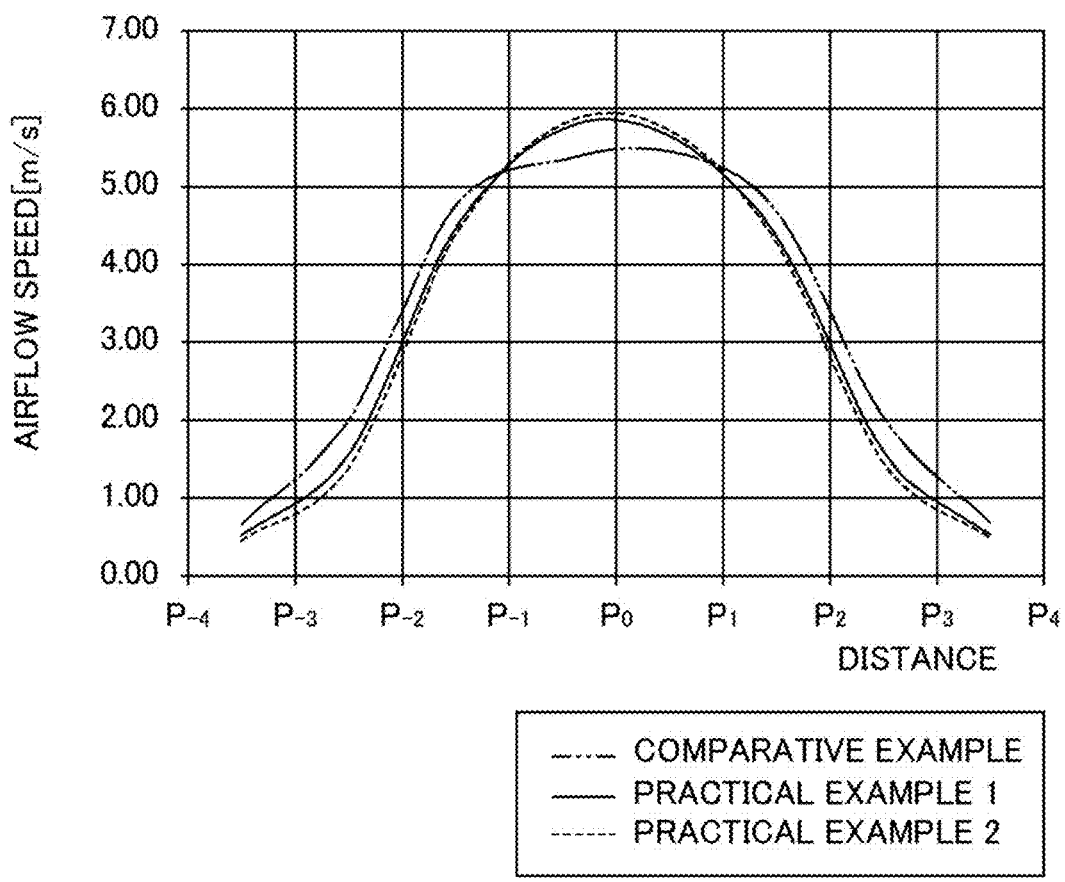
FIG. 11 is a graph showing test results of airflow speeds of the comparative example and the practical examples 1 and 2.

FIG. 11 is a graph showing test results of the airflow speeds of the comparative example and the practical examples 1 and 2. Its vertical axis indicates an airflow speed [m/s] and its horizontal axis indicates a distance in a left-right direction with the center of the airflow direction 4 defined as a reference position "0". Specifically, signs $P_{-4}$ to $P_4$ shown along the horizontal axis correspond to positions of signs $P_{-4}$ to $P_4$ show in FIG. 10B, respectively. As show in FIG. 11, in the comparative example and the practical examples 1 and 2, the airflow speeds get lower as the distance in the right-left direction gets larger. However, a portion near the center of the airflow direction 4 in a waveform of the comparative example is flat, whereas a portion near the center of the airflow direction 4 in each waveform of the practical examples 1 and 2 is protuberant. Namely, the airflow speeds in an area near the center of the airflow direction 4 in the practical samples 1 and 2 are higher than that in the comparative example.

According to the practical examples 1 and 2, it can be known that the airflow is made convergent to the center of the airflow direction 4 by making the grill 12 spherical and thereby the airflow speed can be improved. It is also know by the comparison between the practical example 1 (the curvature radius R105) and the practical example 2 (the curvature radius R92) that the airflow is made further convergent to the center of the airflow direction 4 in the practical example 2 and thereby the airflow speed becomes slightly higher.

Note that it is preferable that the curvature radius R of the grill 12 is about 80 mm to about 120 mm (more preferably, about 90 mm to about 110 mm) in the case where the diameter $R_0$ of the fan 17 is about 150 mm, for example. Although explanations made here are premised on the case where the diameter $R_0$ of the fan 17 is about 150 mm, the diameter $R_0$ of the fan 17 can be changed arbitrarily within a range about 120 mm to about 240 mm, for example. Needless to say, if the diameter $R_0$ of the fan 17 changes, the preferable range (about 80 mm to about 120 mm) of the curvature radius R of the grill 12 may change similarly.

Comparison of Reach Distances of Airflows

Figure 12:
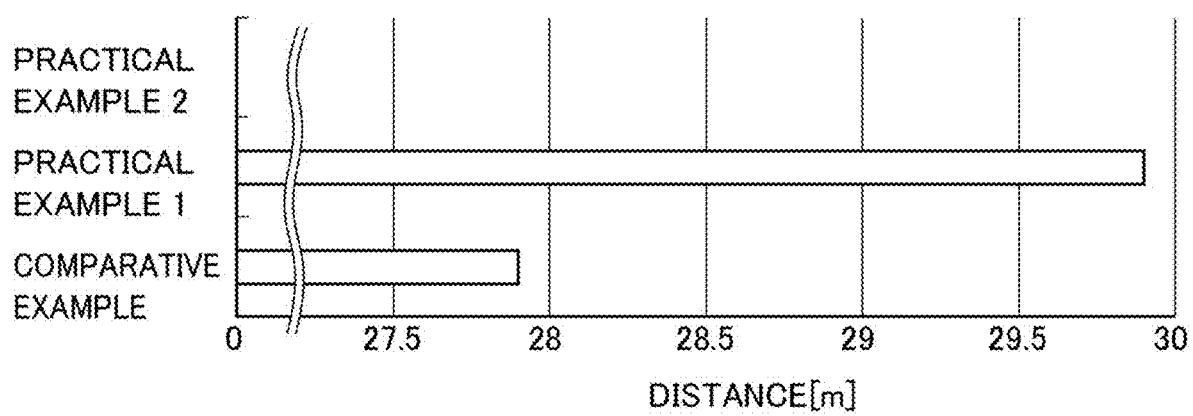
FIG. 12 is a graph showing test results of reach distances of air of the comparative example and the practical examples 1 and 2.

FIG. 12 is a graph showing test results of reach distances of the airflows of the comparative example and the practical examples 1 and 2. As shown in FIG. 12, the reach distance [m] of the comparative example is about 28 m, but that of the practical example 1 is about 30 m and that of the practical example 2 is about 29 m. In this manner, it is know that, according to the practical examples 1 and 2, the airflow is made convergent to the center of the airflow direction 4 by forming the grill 12 spherical and thereby the reach distance of the airflow can be improved. Although a strong airflow that flows farther can be brought due to its spiral airflow also in the comparative example, the reach distances can be extended further and according to the practical examples 1 and 2 thereby an air agitation effect inherently brought by an air circulator becomes prominent.

Correlation of Fan and Grill

As shown in FIG. 6, it is denoted that the curvature radius of the grill 12 is R, the diameter of the fan 17 is $R_0$, an outer diameter of the blower unit 2 is $R_1$, and a diameter of the airflow opening 11 (an inner diameter of the airflow tunnel 16) is $R_2$. It is acceptable that the diameter of the hollow cylindrical airflow tunnel 16 may get slightly large or small.

First, the preferable range of the curvature radius R of the grill 12 is about 80 mm to about 120 mm (more preferably, about 90 mm to about 110 mm) in the case where the diameter $R_0$ of the fan 17 is about 150 mm, and its actually measured value is about 105 mm. In view of relation between the diameter $R_0$ of the fan 17 and the curvature radius R of the grill 12, it can be understood that the preferable range of the curvature radius R of the grill 12 is a range in which $R/R_0$ =about 53.3% to about 80.0% (more preferably, about 60.0% to about 73.3%) is satisfied.

If the curvature radius R of the grill 12 is smaller than its lower limit value, the grill 12 in the blower unit 2 has a distorted shape. The lower limit value referred to here is about 53.3% (more preferably, about 60.0%) of the diameter $R_0$ of the fan 17. On the other hand, if the curvature radius R of the grill 12 is larger than its upper limit value, the effect of the increase of the airflow speed cannot be brought sufficiently. The upper limit value referred to here is about 80.0% (more preferably, about 73.3%) of the diameter $R_0$ of the fan 17.

In addition, a preferable range of the outer diameter $R_1$ of the blower unit 2 is about 160 mm to about 240 mm in the case where the diameter $R_0$ of the fan 17 is about 150 mm. In view of relation between the outer diameter $R_1$ of the blower unit 2 and the diameter $R_0$ of the fan 17, it can be understood that the preferable range of the outer diameter $R_1$ of the blower unit 2 is a range in which $R_1/R_0$=about 107% to about 160% is satisfied. Since the blower unit 2 has a spherical shape, the outer diameter $R_1$ of the blower unit 2 is about twice as large as the curvature radius R of the grill 12.

If the outer diameter $R_1$ of the blower unit 2 is smaller than about 107% of the diameter $R_0$ of the fan 17, a clearance between the fan 17 and the airflow tunnel 16 cannot be ensured and thereby contacts of the fan 17 with the inner face of the airflow tunnel 16 are concerned, and production becomes difficult. On the other hand, if the outer diameter $R_1$ of the blower unit 2 is larger than about 160% of the diameter $R_0$ of the fan 17, a size of the blower unit 2 becomes too large and thereby it becomes top-heavy to dispute a balance with the base unit 3.

In addition, a preferable range of the diameter $R_2$ of the airflow opening 11 is about 155 mm to about 175 mm in the case where the diameter $R_0$ of the fan 17 is about 150 mm. In view of relation between the diameter $R_2$ of the airflow opening 11 and the diameter $R_0$ of the fan 17, it can be understood that the preferable range of the diameter $R_2$ of the airflow opening 11 is a range in which $R_2/R_0$=about 103% to about 117% is satisfied. When making the diameter $R_2$ of the airflow opening 11 small, an advantage of ensuring a length of the airflow tunnel 16 can be brought.

If the diameter $R_2$ of the airflow opening 11 is smaller than about 103% of the diameter $R_0$ of the fan 17, a clearance between the fan 17 and the airflow tunnel 16 cannot be ensured and thereby their contacts are concerned, and production becomes difficult. On the other hand, if the diameter $R_2$ of the airflow opening 11 is larger than about 117% of the diameter $R_0$ of the fan 17, a length of the airflow tunnel 16 cannot be ensured in the spherical blower unit 2 and thereby it becomes difficult to keep the directionality and the straightness of the blown-out airflow.

In view of relation between the diameter $R_2$ of the airflow opening 11 and the outer diameter $R_1$ of the blower unit 2, it can be understood that the preferable range of the diameter $R_2$ of the airflow opening 11 is a range in which $R_2/R_1$=about 74% to about 83% is satisfied.

When the ratio $R_2/R_1$ is relatively small in this manner, brought is an effect that an area occupied by the airflow opening 11 in a front view of the blower unit 2 looks small.

If the diameter $R_2$ of the airflow opening 11 is smaller than about 74% of the outer diameter $R_1$ of the blower unit 2, a clearance between the fan 17 and the airflow tunnel 16 cannot be ensured and thereby their contacts are concerned further. On the other hand, if the diameter $R_2$ of the airflow opening 11 is larger than about 83% of the outer diameter $R_1$ of the blower unit 2, a length of the airflow tunnel 16 cannot be ensured in the spherical blower unit 2 and thereby it becomes more difficult to keep the directionality and the straightness of the blown-out airflow.

Spherical Design+Inside Airflow Tunnel

The blower unit 2 has a sleek spherical shape and no sharp edge, and thereby looks compact. In addition, its cute appearance and its fashionable look can be improved. On the other hand, the airflow tunnel 16 necessarily has a sufficient length in order to stabilize the airflow speed of the airflow blown out from the air circulator 1. Therefore, a following configuration is adopted in the air circulator 1 according to the present embodiment.

Figure 13:
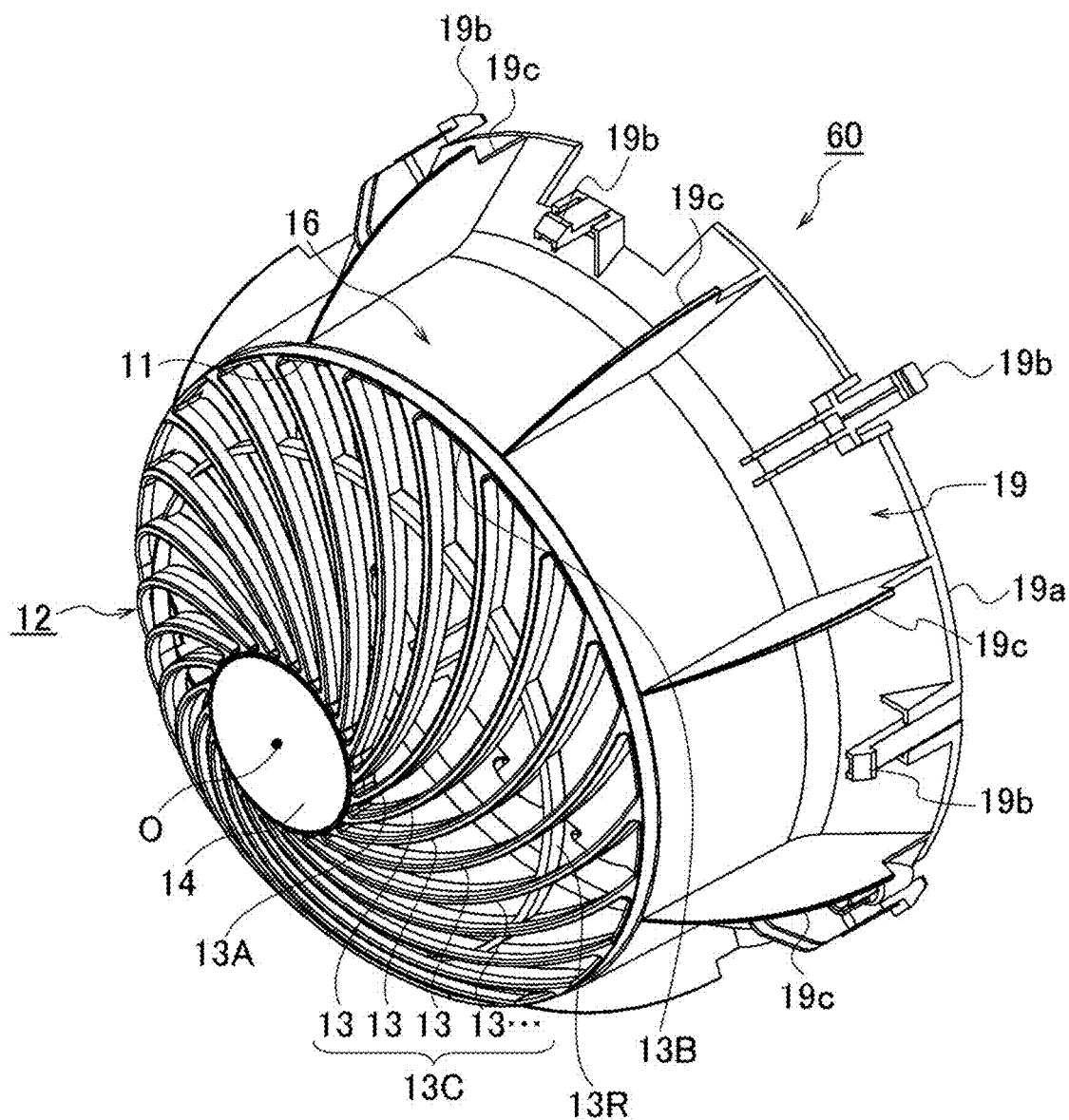
FIG. 13 is a perspective view of an air passage forming member provided in the air circulator according to the present embodiment.

FIG. 13 is a perspective view of the air passage forming member 60 included in the air circulator 1 according to the present embodiment. As shown in FIG. 13, the air passage forming member 60 is a member for forming an air passage, and has the grill 12, the airflow tunnel 16 and the radially-expanded hollow cylindrical portion 19. The air passage forming member 60 is made of synthetic plastic material by integrally molding the grill 12, the airflow tunnel 16 and the radially-expanded hollow cylindrical portion 19.

The airflow tunnel 16 is a hollow cylindrical member provided on radially outer side of the fan 17, and the inner diameter of the airflow tunnel 16 is almost identical to the inner diameter of the airflow opening 11.

The radially-expanded hollow cylindrical portion 19 is a portion for coupling with the rear cover 15b, and is a hollow cylindrical tapered member whose diameter is made gradually larger as it extends backwards. Plural engagement pawls 19b that are to be engaged with the rear cover 15b are provided on a rearmost end 19a of the radially-expanded hollow cylindrical portion 19.

Plural reinforcing ribs 19c are raised vertically from an outer circumferential surface of the air tunnel 16 and the radially-expanded hollow cylindrical portion 19, and thereby strength of the radially-expanded hollow cylindrical portion 19 is ensured. Each outer edge of the reinforcing ribs 19c is formed so as to contact with an inside surface of an outer-shell spherical cover member 15c.

When attaching the outer-shell spherical cover member 15c to the outer surface of the air passage forming member 60, the front face of the grill 12 (the front end faces of the plural fins 13) and the outer circumferential face of the outer-shell spherical cover member 15c constitute a continuous spherical surface.

It becomes possible, by integrally molding the air tunnel 16 and the grill 12, to reduce component counts and production costs while ensuring strength of a joint portion between the air tunnel 16 and the grill 12.

In addition, by forming the continuous spherical surface with the front face of the grill 12 (the front end faces of the plural fins 13) and the outer circumferential face of the outer-shell spherical cover member 15c, no stepped surface is formed at a portion between the grill 12 and the outer-shell spherical cover member 15c in the blower unit 2 and thereby a beautiful spherical shape can be brought to improve the appearance.

By providing the air tunnel 16 inside the outer-shell spherical cover member 15c, the directionality and the straightness of the blown-out airflow can be improved and performance as an air circulator can be made stable.

Air Passage Forming Member

Figure 14:
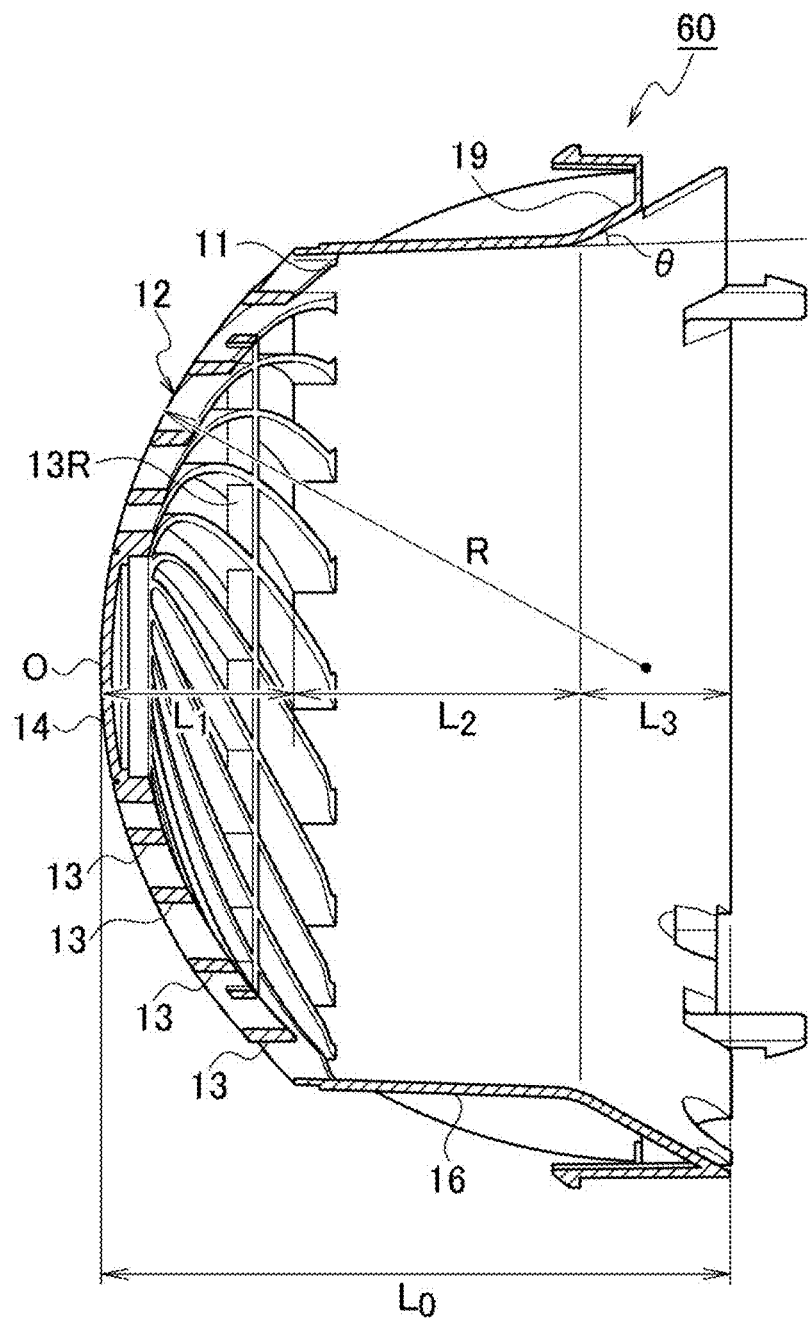
FIG. 14 is a cross-sectional view of the air passage forming member provided in the air circulator according to the present embodiment.

FIG. 14 is a cross-sectional view of the air passage forming member 60 included in the air circulator 1 according to the present embodiment. As shown in this figure, it is denoted that an entire length of the air passage forming member 60 is $L_0$, the protrusion of the grill 12 is $L_1$, a length of the airflow tunnel 16 is $L_2$, a length of the radially-expanded hollow cylindrical portion 19 is $L_3$, the curvature of the grill 12 is R, and a tapered angle of an inner circumferential surface of the radially-expanded hollow cylindrical portion 19 is $\theta$. The entire length $L_0$ of the air passage forming member 60 is a length from the front end of the grill 12 to the rear end of the radially-expanded hollow cylindrical portion 19, and $L_0=L_1+L_2+L_3$. Explanations made hereinafter are also premised on the case where the diameter $R_0$ of the fan 17 is about 150 mm. Needless to say, if the diameter $R_0$ of the fan 17 changes, their dimensions may change similarly.

A preferable range of the length $L_2$ of the airflow tunnel 16 is about 45 mm to about 60 mm in the case where the diameter $R_0$ of the fan 17 is about 150 mm, and its actually measured value is about 50 mm. It can be understood that the preferable range of the length $L_2$ of the airflow tunnel 16 is about 30% to about 40% of the diameter $R_0$ of the fan 17

(about 150 mm). When the airflow tunnel 16 is made long, the directionality and the straightness of the airflow can be ensured.

If the length $L_2$ of the airflow tunnel 16 is smaller than about 30% of the diameter $R_0$ of the fan 17 (about 45 mm), the airflow tunnel 16 is too short and thereby the directionality and the straightness of the airflow cannot be ensured. On the other hand, if the length $L_2$ of the airflow tunnel 16 is larger than about 40% of the diameter $R_0$ of the fan 17 (about 60 mm), the protrusion $L_1$ of the grill 12 or the length $L_3$ of the radially-expanded hollow cylindrical portion 19 becomes small and thereby the effect of the increase of the airflow speed cannot be brought sufficiently.

In addition, the entire length $L_0$ of the air passage forming member 60 is set larger than the curvature radius R of the grill 12 (105 mm). Therefore, the rear end portion (the radially-expanded hollow cylindrical portion 19) of the air passage forming member 60 protrudes rearward from the hemispherical front cover 15a, and the rear end portion of the air passage forming member 60 is installed into the rear cover 15b. It becomes easier to ensure the length $L_2$ of the airflow tunnel 16 as the entire length $L_0$ of the air passage forming member 60 gets larger, but the grill 12 is formed spherically and thereby the length $L_2$ cannot be made larger by extending the airflow tunnel 16 forward. In the present embodiment, the length $L_2$ of the airflow tunnel 16 is ensured by setting the entire length $L_0$ of the air passage forming member 60 larger than the curvature radius R of the grill 12 and installing a part of the radially-expanded hollow cylindrical portion 19 on a rear side of the airflow tunnel 16 into the rear cover 15b. Further, the length $L_3$ of the radially-expanded hollow cylindrical portion 19 can be also ensured sufficiently.

In addition, the tapered angle θ of the radially-expanded hollow cylindrical portion 19 is set to 15 degrees to 30 degrees. By making the radially-expanded hollow cylindrical portion 19 at the rear end of the air passage forming member 60 tapered with the angle 15 degrees to 30 degrees in this manner, the airflow from the rear can be guided smoothly. Further, the airflow speed increases while entering into the airflow tunnel 16 from the radially-expanded hollow cylindrical portion 19 due to the decrease of the flow passage area, and thereby it can contribute to the increase of the airflow speed.

If the tapered angle θ of the radially-expanded hollow cylindrical portion 19 is smaller than 15 degrees, it becomes difficult to get the effect of the increase of the airflow speed due to the decrease of the flow passage area while entering into the airflow tunnel 16 from the radially-expanded hollow cylindrical portion 19. On the other hand, if the tapered angle θ is larger than 30 degrees, airflow resistance in the radially-expanded hollow cylindrical portion 19 becomes large and thereby it is concerned that the airflow from the rear cannot flow smoothly.

Relation Between Fan and Air Passage Forming Member

Figure 15:
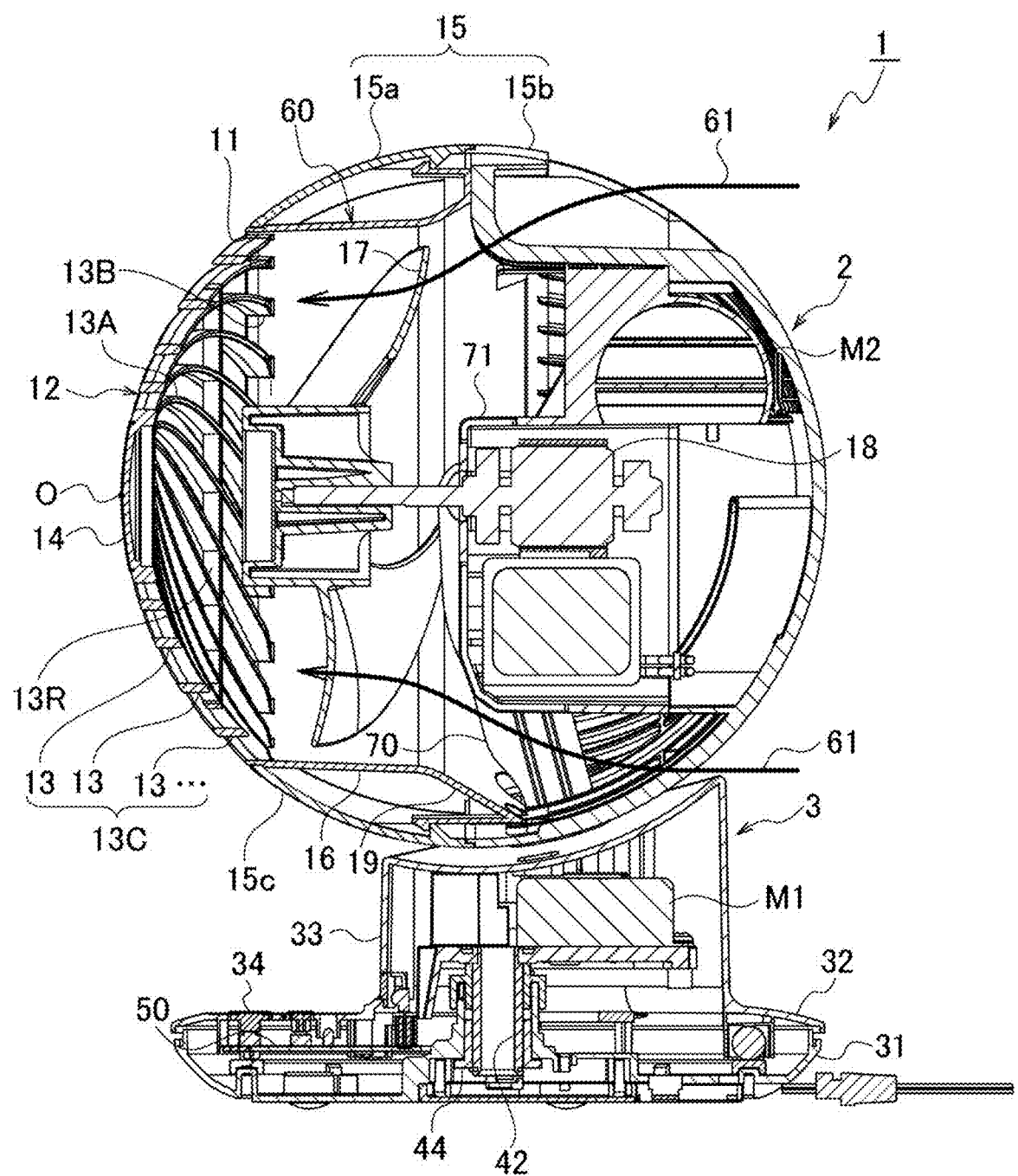
FIG. 15 is a cross-sectional view of the air circulator according to the present embodiment.

A flow passage(s) of air 61 flowing in the air circulator 1 is shown in FIG. 15. The airflow speed of the air 61 flowing in the air circulator 1 increases while entering into the airflow tunnel 16 from the radially-expanded hollow cylindrical portion 19 due to the decrease of the flow passage area. Therefore, it contributes to the increase of the airflow speed of the airflow blown out air from the airflow opening 11. Note that, as shown in FIG. 15, the air passage forming member 60 surrounds the fan 17 from the outside and the air passage forming member 60 extends backward from the position of the rear end of the fan 17.

Wiring of Electrical Cables

Figure 16:
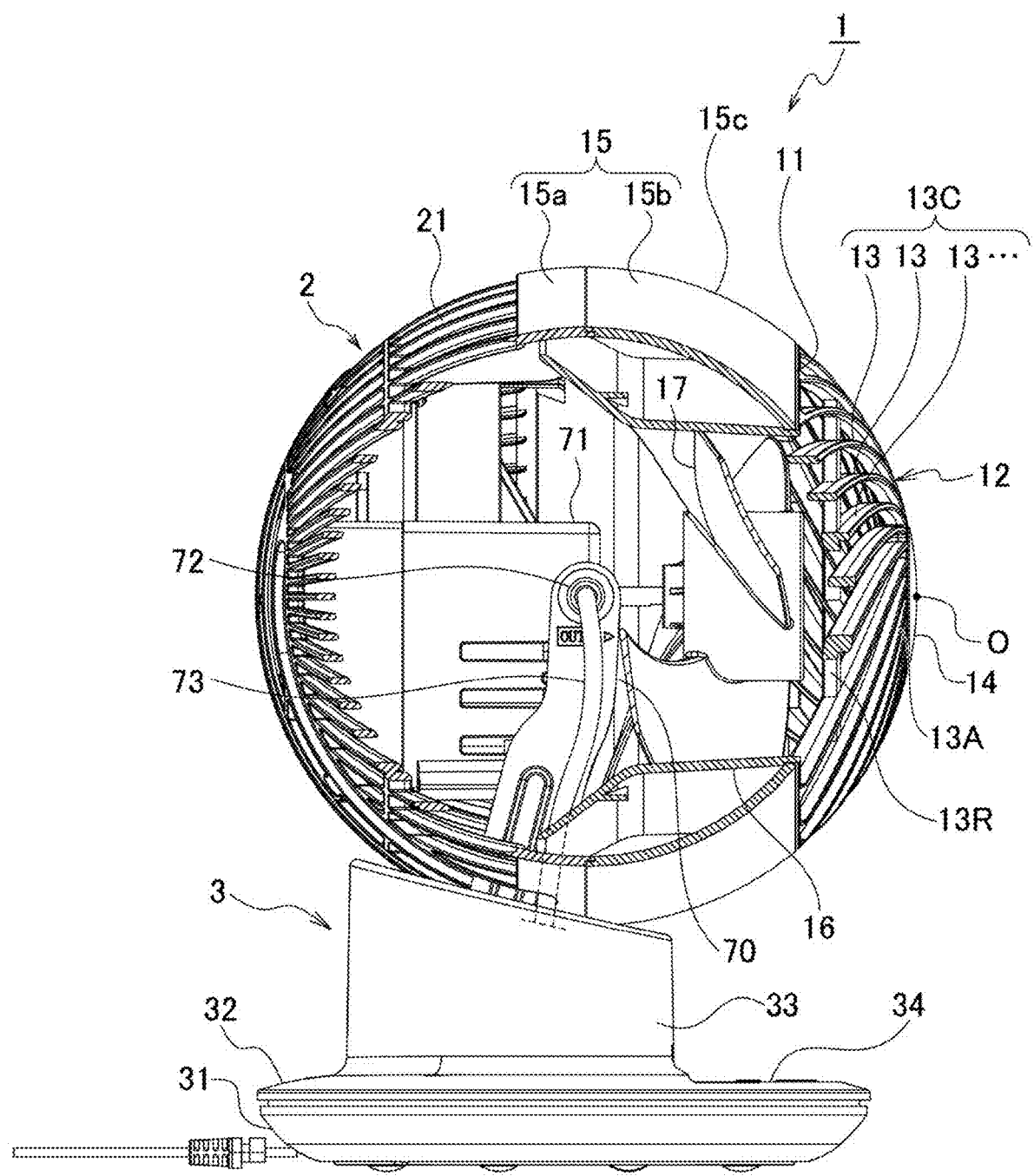
FIG. 16 is a cross-sectional view showing an internal mechanism of the air circulator according to the present embodiment.
Figure 17:
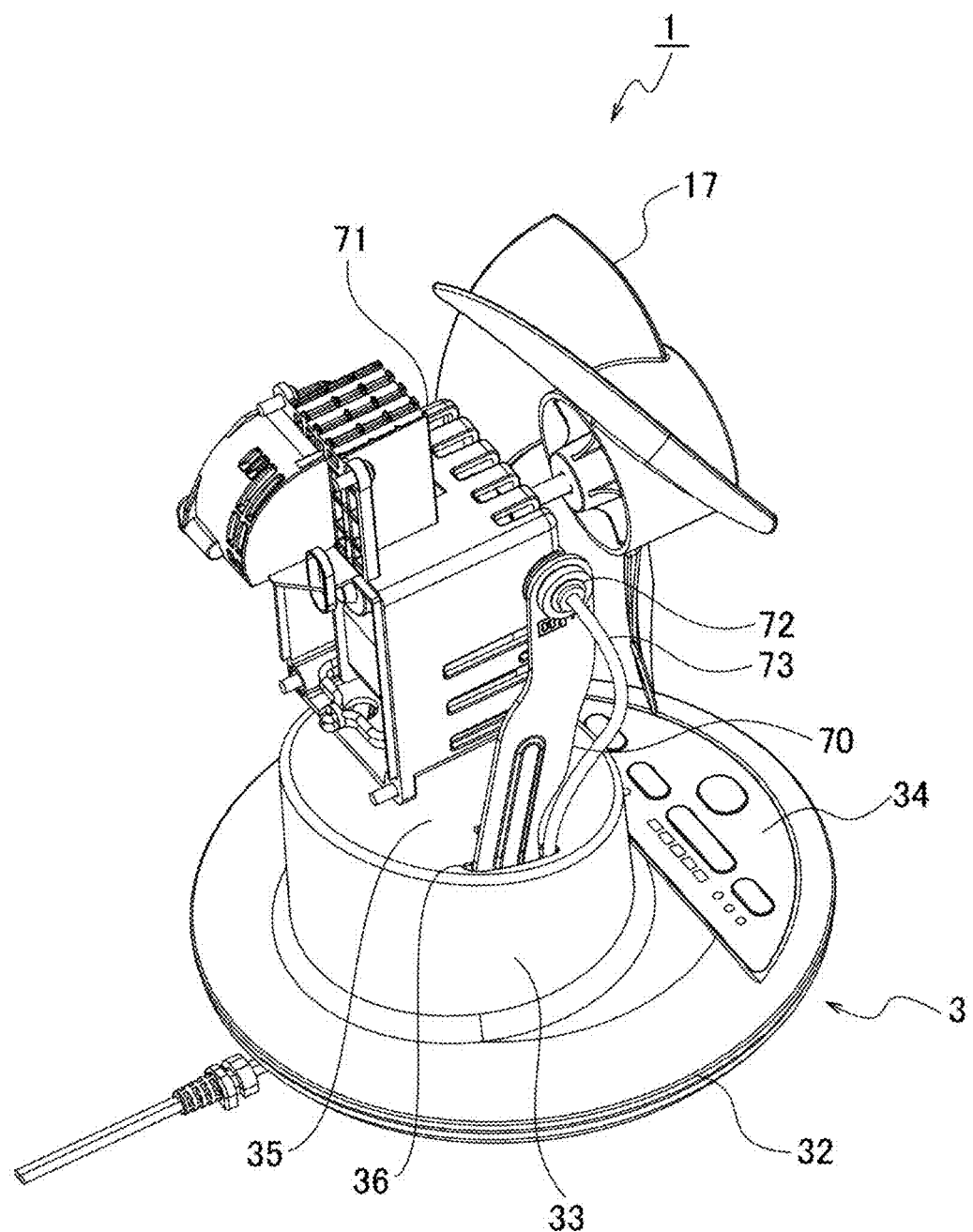
FIG. 17 is a perspective view showing the internal mechanism of the air circulator according to the present embodiment.

FIG. 16 and FIG. 17 show an internal mechanism of the air circulator 1 according to the present embodiment. Specifically, FIG. 16 is a cross-sectional view in a case of cross-sectioning on a left side from the center of the blower unit 2, and FIG. 17 is a perspective view in a case of being viewed downward from obliquely rear left with the cover 15 and the air passage forming member 60 removed.

As shown in FIG. 16 and FIG. 17, a motor cover 71 is held from its both sides by support pillars 70 raised up from the base unit 3, and the blower unit 2 swings with respect to the base unit 3 about this held position as an axial shaft 72 of the up-down swinging. Here, an electrical cable 73 connected to the motor 18 (see FIG. 6) for the fan 17 accommodated in the motor case 71 and to the motor M2 (see FIG. 6) for the up-down swinging may be drawn out through the axial shaft 72. The electrical cable 73 drawn out through the axial shaft 72 of the up-down swinging is drawn into the inside of the based unit 3 through a hole 36 formed on an upper face 35 of the base unit 3. The electrical cable 73 may be fixed at an arbitrary position of the support pillar 70. According to the configuration of passing the electrical cable 73 through the rotational center of the up-down swinging in this manner, no twisting force is applied to the electrical cable 73 during the up-down swinging and thereby the electrical cable 73 can be prevented from breaking.

Up-Down Swing Mechanism

Figure 18:
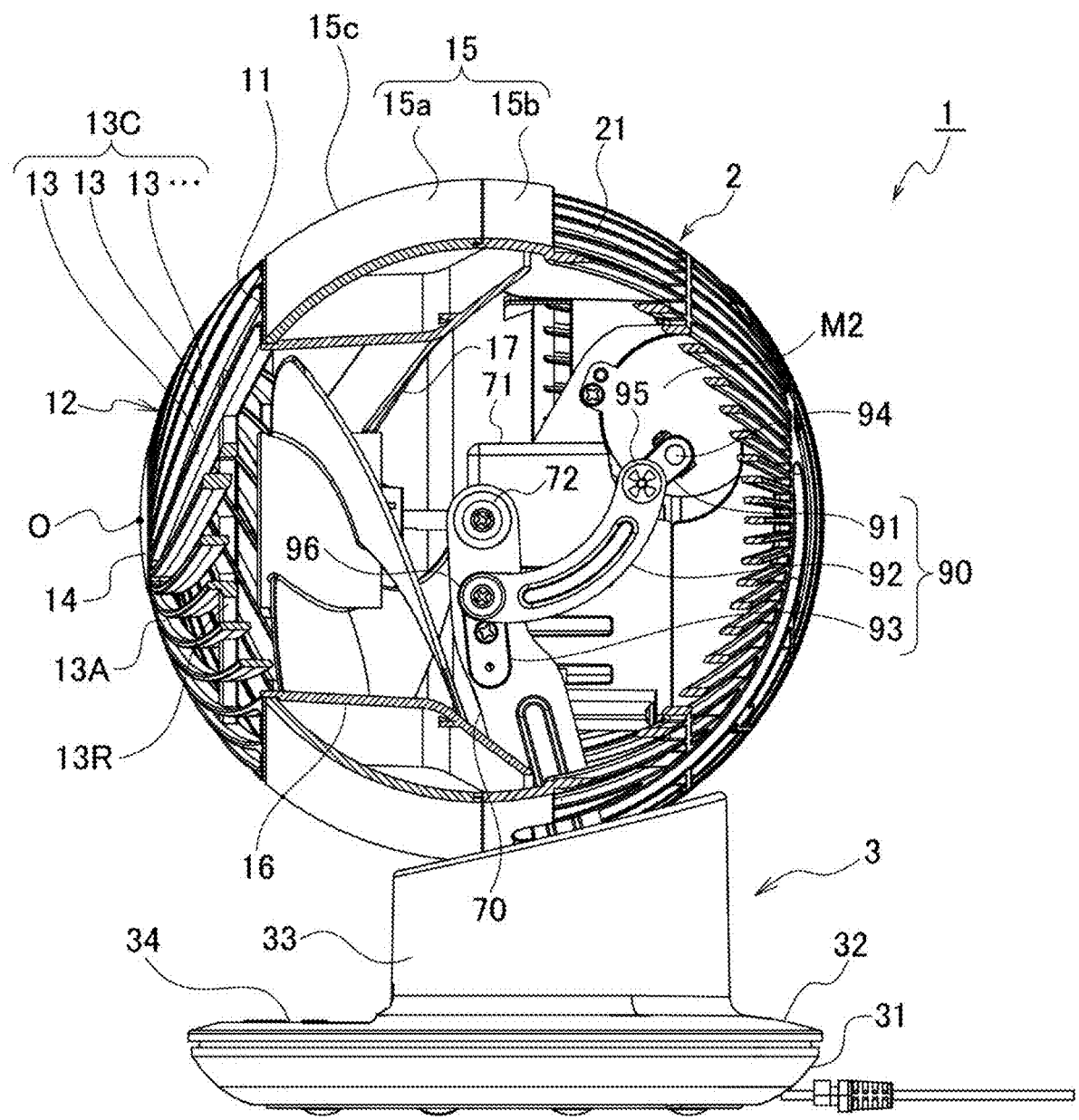
FIG. 18 is a cross-sectional view showing the internal mechanism of the air circulator according to the present embodiment.
Figure 19:
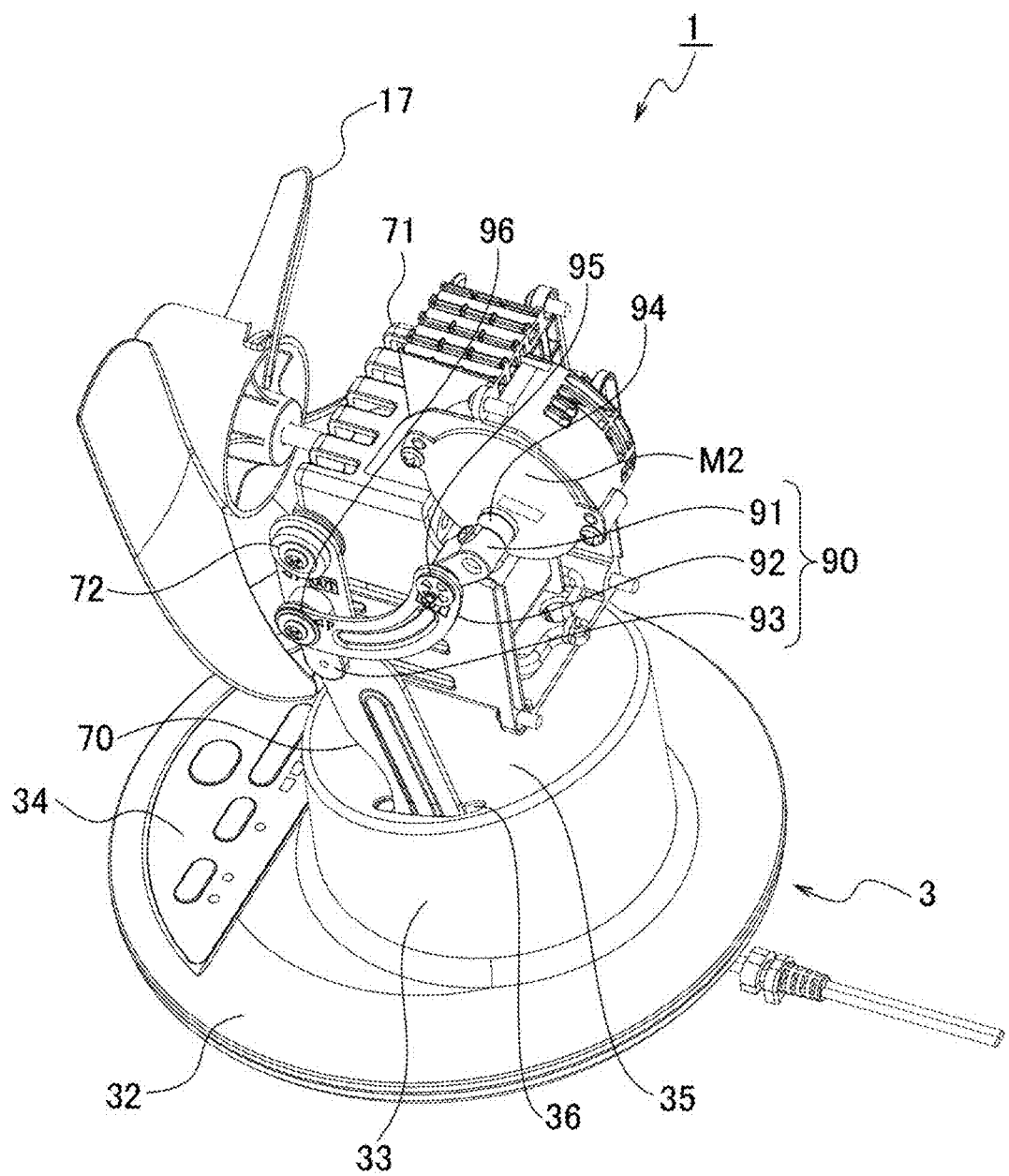
FIG. 19 is a perspective view showing the internal mechanism of the air circulator according to the present embodiment.

FIG. 18 and FIG. 19 show the internal mechanism of the air circulator 1 according to the present embodiment. Specifically, FIG. 18 is a cross-sectional view in a case of cross-sectioning on a right side from the center of the blower unit 2, and FIG. 19 is a perspective view in a case of being viewed downward from obliquely rear right with the cover 15 and the air passage forming member 60 removed.

In addition, as shown in FIG. 18 and FIG. 19, an output shaft 94 of the motor M2 for the up-down swinging is linked with the support pillar 70 via a link mechanism 90 for the up-down swinging. Specifically, the link mechanism 90 includes a swing arm member 91 fixed with the output shaft 94 of the motor M2 for the up-down swinging, a fixed member 93 fixed on the support pillar 70, and a bow-shaped link member 92 whose one end is pivotally coupled with the swing arm member 91 and whose another end is pivotally coupled with the fixed member 93. A rubber washer 95 may be interposed between the swing arm member 91 and the link member 92, and a rubber washer 96 may be interposed between the link member 92 and the fixed member 93. According to this, vibrations are absorbed by the rubber washers 95 and 96, and thereby backlashes of the synchronous motor (the motor 2 for the up-down swinging) and noise of the link mechanism 90 due to clearances between the members 91, 92 and 93 can be prevented. Note that one of the two rubber washer 95 and 96 can be omitted.

Control Panel

Figure 20:
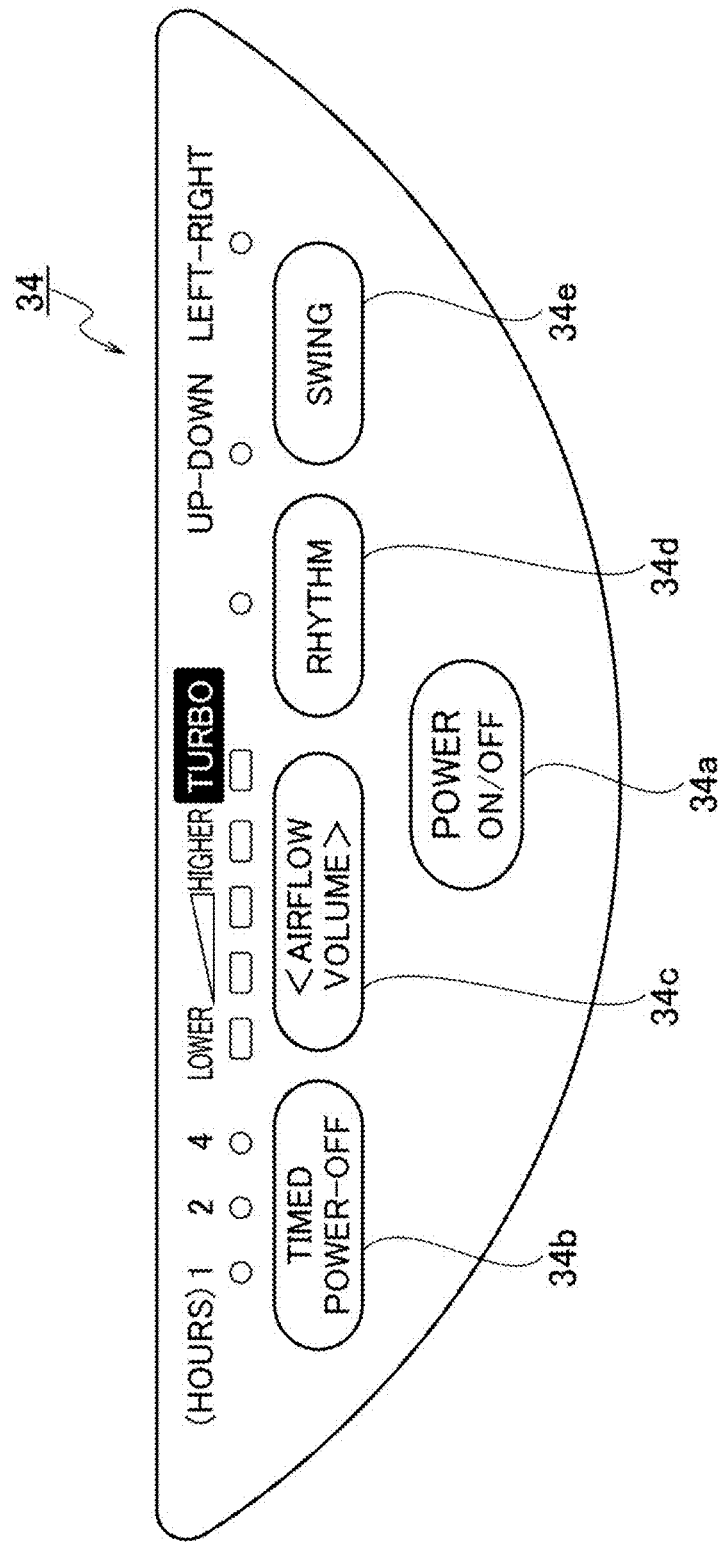
FIG. 20 is a plan view of a control panel provided in the air circulator according to the present embodiment.

FIG. 20 is a plan view of the control panel 34 included in the air circulator 1 according to the present embodiment. As shown in FIG. 20, a power button 34a, a timed power-off button 34b, an airflow volume button 34c, a rhythm button 34d, a swing button 34e and so on are included in the control panel 34. The power button 34a is a button for setting power off/on. The timed power-off button 34b is a button for setting a power-off timer. The airflow volume button 34c is a button for adjusting a volume rate of airflow of the blower unit 2, and a lower/higher setting of its volume rate of airflow can be changed in five levels sequentially, breeze, low, middle, high and turbo, every one pushing. The rhythm button 34e is a button for setting an after-explained rhythm air. The sing button 34d is a button for setting turning-on/off of the up-down swinging and the left-right swinging.

Rear Cover

Next, the rear cover 15b will be explained further in detail with reference to FIG. 5. As already explained, the large number of the air-through openings 21 for taking in external air are formed on almost the entire of the rear cover 15b. In the present embodiment, air holes 21a are additionally formed on a portion of the rear cover 15b behind the motor. Therefore, external air is taken in from the air holes 21a behind the motor while the motor 18 drives the fan 17, so that not only larger volume rate of airflow can be ensured but also airflow generated by the motor 18 itself brings a cooling effect for heat generation measures.

Left-Right Swing Mechanism

Figure 21:
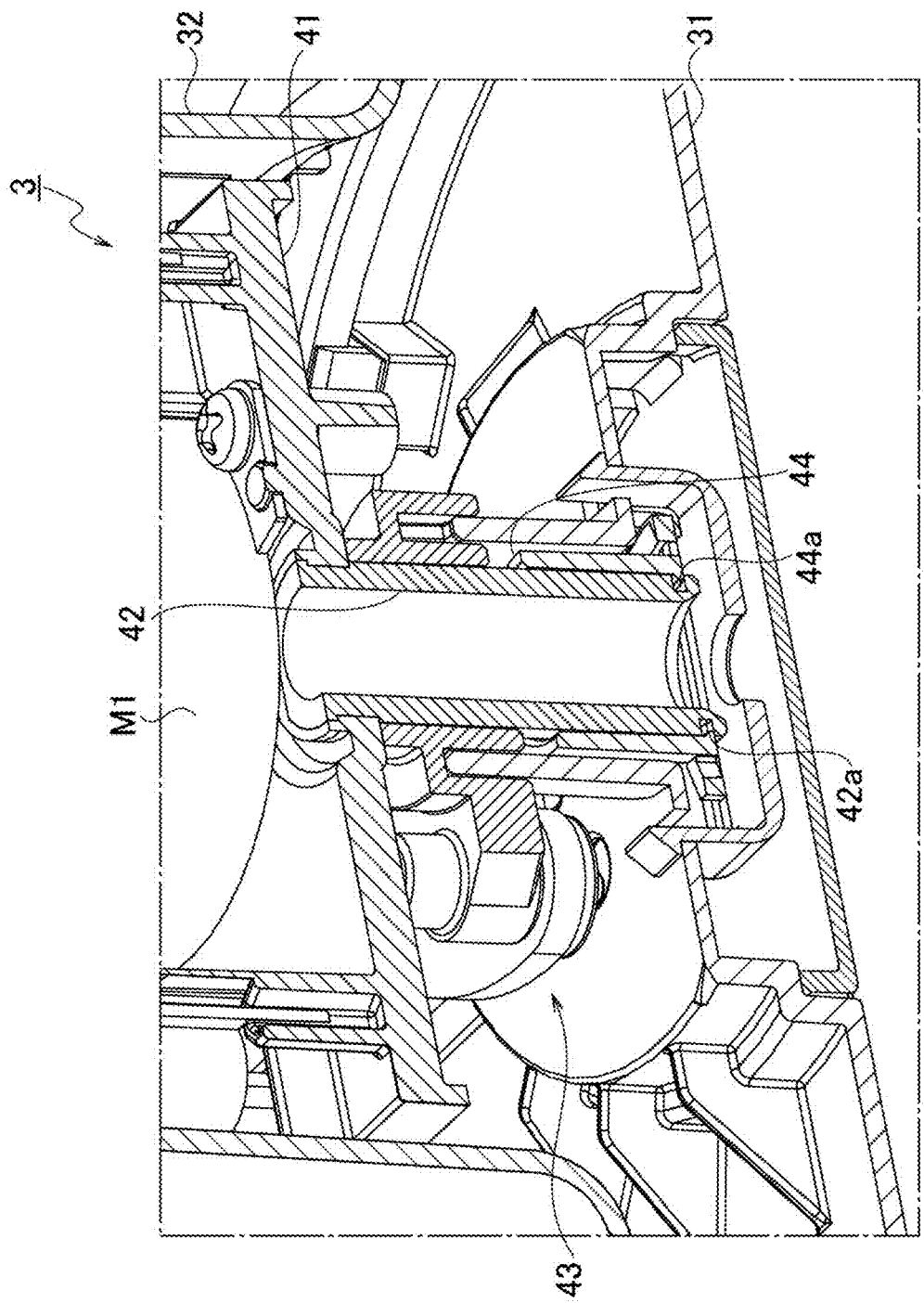
FIG. 21 is a cross-sectional view of a left-right swing mechanism provided in the air circulator according to the present embodiment.

FIG. 21 is a cross-sectional view showing a left-right swing mechanism 43 included in the air circulator 1 according to the present embodiment. As shown in FIG. 21, a void space is provided in the base unit 3, and the left-right swing mechanism 43 is accommodated in the void space. The left-right swing mechanism 43 includes a fixed plate 41 fixed with the base upper portion 32, a center shaft 42 made integrated with the fixed plate 41 by insert-molding, and the motor M1 for the swinging that is fixed on an upper surface of the fixed plate 41. It includes a shaft receiving member (bush) 44 that is made of plastics and into which a lower end of the center shaft 42 is inserted, and an engagement pawl 44a is integrally formed along a lower-end inner circumference of the shaft receiving member 44. A notched groove 42a is formed along a lower-end outer circumference of the center shaft 42, the engagement pawl 44a is pressed into the notched groove 42a.

Figure 22:
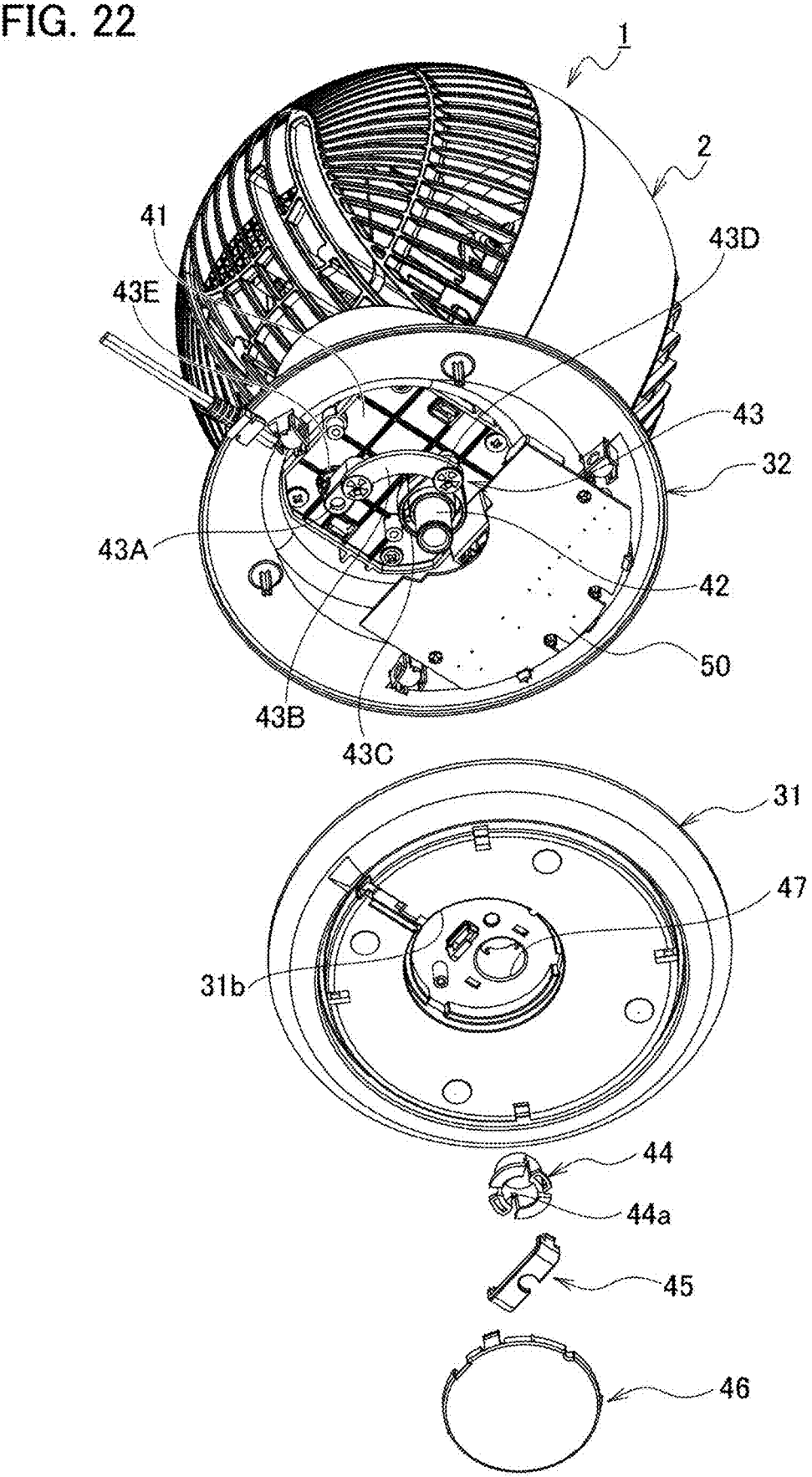
FIG. 22 is an exploded view of a base unit provided in the air circulator according to the present embodiment.

FIG. 22 is an exploded view of the base unit 3 included in the air circulator 1 according to the present embodiment. Hereinafter, the left-right swing mechanism 43 will be explained further in detail by using FIG. 22.

As already explained, the void space is provided in the base unit 3, and the left-right swing mechanism 43 is accommodated in the void space. The left-right swing mechanism 43 includes the fixed plate 41, the motor M1 (see FIG. 21) for the swinging that is fixed on the upper surface of the fixed plate 41, an eccentric cam 43A fixed with an output shaft 43E of the swinging motor M1, a fixed shaft 43D fixed with the base lower portion 31, and a bow-shaped coupling link 43B whose one end is pivotally coupled with the eccentric cam 43A and whose another end is pivotally coupled with the fixed shaft 43D.

In addition, the fixed plate 41 is fixed with the base upper portion 32, and the center shaft 42 is swivelably inserted into the shaft receiving member 44. The motor M1 for the swinging (including the eccentric cam 43A fixed with its output shaft 43E) and the fixed shaft 43D are provided at a position distanced from the center shaft 42.

In addition, the hollow cylindrical shaft receiving member 44, on the inner circumference of whose lower end the engagement pawl 44a is formed, is inserted into a shaft insertion hole 47 formed on the base lower portion 31. The center shaft 42 is inserted into this shaft receiving member 44. The notched groove 42a is formed on the outer circumference of the lower end of the center shaft 42, and the engagement pawl 44a that serves as an engagement flange is pressed into the said notched groove 42a. A cord folder 45 is installed beneath the shaft receiving member 44, and then an opening 31b formed on a lower plate of the base lower portion 31 is closed by a bottom cap 46.

In addition, the fixed plate 41 and an upper end of the center shaft 42 are insert-molded with each other, and the base upper portion 31 and the base lower portion 32 are coupled with each other by the center shaft 42 and the shaft receiving member 44 for the center shaft 42 is fixed with the base lower portion 31. Since the center shaft 42 is inserted into the shaft insertion hole 47 with the shaft receiving member 44 interposed therebetween, no clearance is formed between the center shaft 42 and the shaft insertion hole 47 to prevent frictions with the shaft insertion hole 47 due to swinging of the center shaft 42 and noises generated by them and to smoothen the swinging of the base upper portion 32 (the blower unit 2) about the center shaft 42.

When a user turns on the left-right swinging by pressing down the swing button 34e on the control panel 34, the eccentric cam 43A fixed with the output shaft 43E of the motor M1 for the swinging rotates eccentrically, and the one end of the coupling link 43B pivotally coupled with the eccentric cam 43A moves in a circular motion. Since the other end of the coupling link 43B is pivotally coupled with the fixed shaft 43D fixed with the base lower portion 31, the base upper portion 32 and the blower unit 2 attached thereon swivel (swing) about the center shaft 42 in the left-right direction due to the said circular motion according to a radius distance of the circular motion.

As explained above, the air circulator 1 according to the present embodiment is the air circulator 1 in which the base lower potion 31 and the base upper portion 32 that is provided swingably on the base lower portion 31 are coupled with each other with the center shaft 42 passed through them and the blower unit 2 is provided on the base upper unit 32; the shaft receiving member 44 is inserted into the base lower portion 31; the center shaft 42 is swivelably inserted into the said shaft receiving member 44; and the fixed plate 41 provided in the base upper portion 32 and the upper end of the center shaft 42 are insert-molded with each other. Therefore, it becomes possible to reduce component counts and production costs while ensuring strength of the joint portion thereof.

In addition, the fixed plate 41 provided in the base upper portion 32 is made of plastics. Therefore, the electrical wire(s) can be prevented from being damaged when the electrical wire contacts with edges (corners) of the fixed plate 41.

In addition, the engagement pawl 44a is integrally molded of plastics on the inner circumference of the lower end of the shaft receiving member 44 for the center shaft 42. Therefore, the engagement pawl 44a functions an alternative of an E-ring, so that it is not needed to use an E-ring and thereby it becomes possible to reduce component counts and production costs.

Joint Portion of Base Unit

Figure 23:
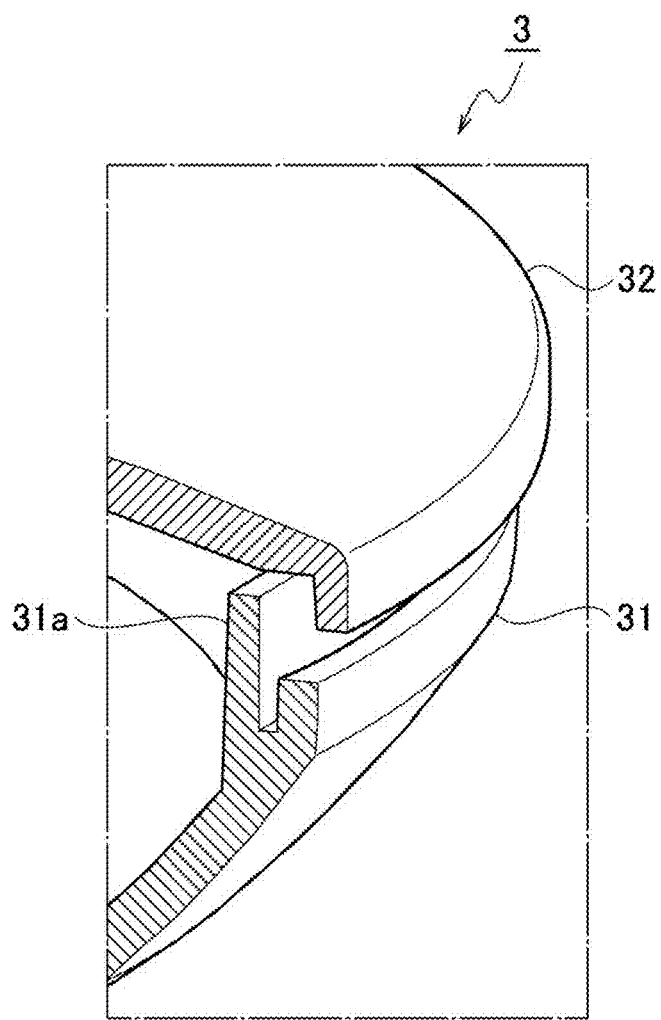
FIG. 23 is a cross-sectional view showing of a joint portion of the base unit provided in the air circulator according to the present embodiment.

FIG. 23 is a cross-sectional view showing a joint portion of the base unit 3 included in the air circulator 1 according to the present embodiment. As shown in FIG. 23, an annular inner wall 31a is raised on an inner side of a circumferential edge of the base lower portion 31, and a circumferential edge of the base upper unit 32 covers over the annular inner wall 31a of the base lower portion 31. Therefore, a gap between the base upper portion 32 and the base lower portion 31 is concealed and thereby made unemphatic by the annular inner wall 31a. Further, a margin can be ensured for a clearance between the upper and lower ones, it becomes possible to prevent the base upper portion 32 and the base lower portion 31 from scratching each other during the left-right swinging and to restrict noises generated due to the scratching. Furthermore, it becomes possible to restrict dusts or the like from entering into the inside of the base unit 3 through the gap between the base upper portion 32 and the base lower portion 31.

Control of Rhythm Air

The air circulator 1 according to the present embodiment includes a controller 50 for controlling powering on/off of the power source, operations of the power-off timer, rotational speed of the motor 18, the swinging and so on. The controller 50 is a control board configured of a CPU (Central Processing Unit), a ROM (Read Only Memory), a RAM (Random Access Memory) and so on (see FIG. 6). When a user turns on the rhythm mode by pressing down the rhythm button 34d on the control panel 34, the controller 50 achieves the rhythm air by controlling the rotational speed of the motor 18.

Figure 24:
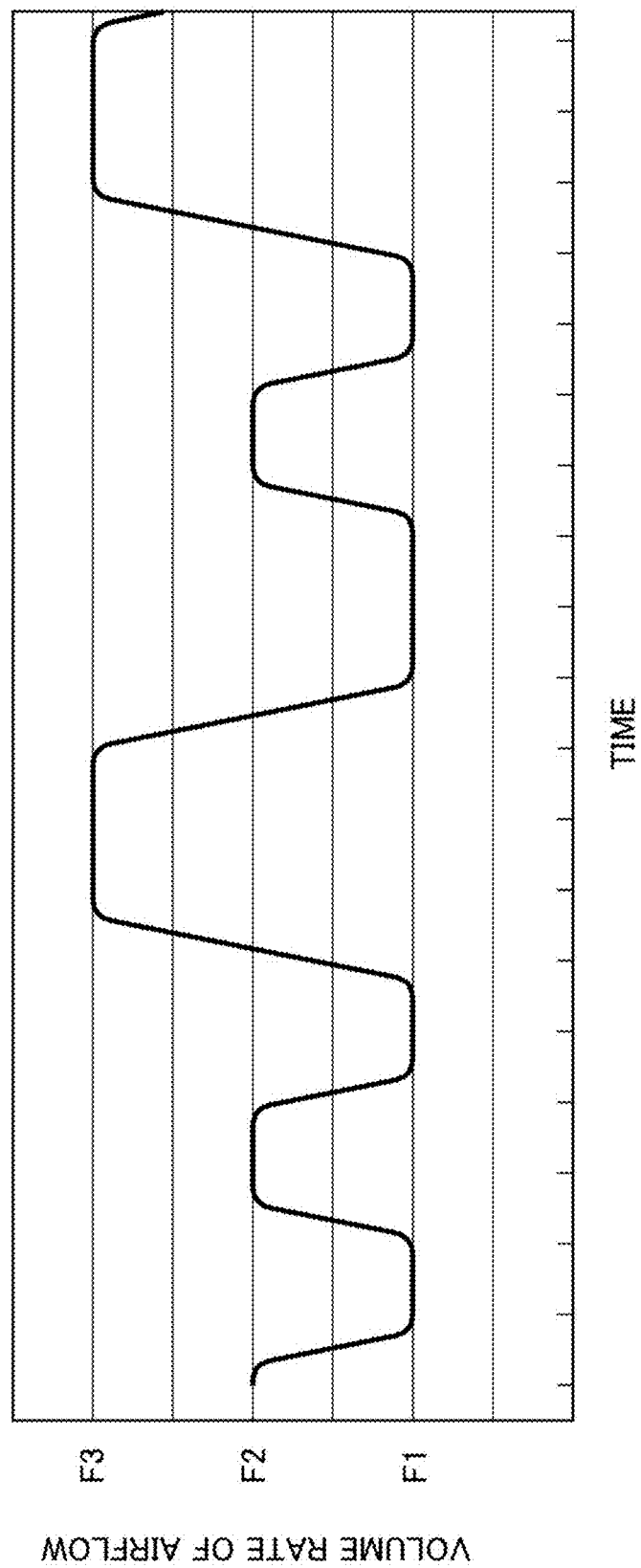
FIG. 24 is a graph showing an example of an adjustment pattern of a volume rate of airflow for rhythm air by the air circulator according to the present embodiment.

FIG. 24 is a graph showing an example of an adjustment pattern of a volume rate of the airflow for the rhythm air blown out from the air circulator 1 according to the present embodiment. Its horizontal axis indicates time and its vertical axis indicates an intensity setting of the volume rate of the airflow. As shown in FIG. 24, in the rhythm mode, weak wind and strong wind are switched over so as not to be simple repeats to generate a fluctuation effect and so as to be similar to natural winds.

Specifically, in the rhythm mode, following twenty airflow volume rate control processes (1) to (20) are executed repeatedly. Namely, when the airflow volume rate control processes (1) to (20) are sequentially done, the process flow returns back to the airflow volume rate control process (1). For example, the airflow volume rate control process (1) means that an operational time with a volume rate of airflow F2 is set to 15 seconds. It may be adopted that a volume rate of airflow F1 corresponds to a volume rate of airflow "breeze", a volume rate of airflow F2 corresponds to a volume rate of airflow "low" and a volume rate of airflow F3 corresponds to a volume rate of airflow "middle".

(1) volume rate of airflow F2 for 15 seconds→(2) volume rate of airflow F1 for 15 seconds→(3) volume rate of airflow F2 for 15 seconds→(4) volume rate of airflow F1 for 15 seconds→(5) volume rate of airflow F3 for 30 seconds→(6) volume rate of airflow F1 for 30 seconds→(7) volume rate of airflow F2 for 15 seconds→(8) volume rate of airflow F1 for 15 seconds→(9) volume rate of airflow F3 for 30 seconds→(10) volume rate of airflow F1 for 30 seconds→(11) volume rate of airflow F2 for 15 seconds→(12) volume rate of airflow F1 for 15 seconds→(13) volume rate of airflow F2 for 15 seconds→(14) volume rate of airflow F1 for 15 seconds→(15) volume rate of airflow F3 for 30seconds→(16) volume rate of airflow F1 for 30 seconds→(17) volume rate of airflow F2 for 15 seconds→(18) volume rate of airflow F1 for 15 seconds→(19) volume rate of airflow F2 for 15 seconds→(20) volume rate of airflow F1 for 15 seconds . . . .

Note that the twenty airflow volume rate control processes (1) to (20) are set as a single unit of the repeats here, but the number of airflow volume rate control processes configuring such a single unit is not limited. In addition, the case where the three settings of the volume rate of airflow F1, F2 and F3 are used for the rhythm air is shown as an example, but the number of the airflow volume rate settings and the intensity of the airflow volume rate setting(s) used for the rhythm air are not also limited. Further, the case where a single unit of the airflow volume rate control process is set to 15 seconds or 30 seconds is shown as an example, but it can be done arbitrarily to increase or decrease the number of seconds for this single unit.

Figure 25A:
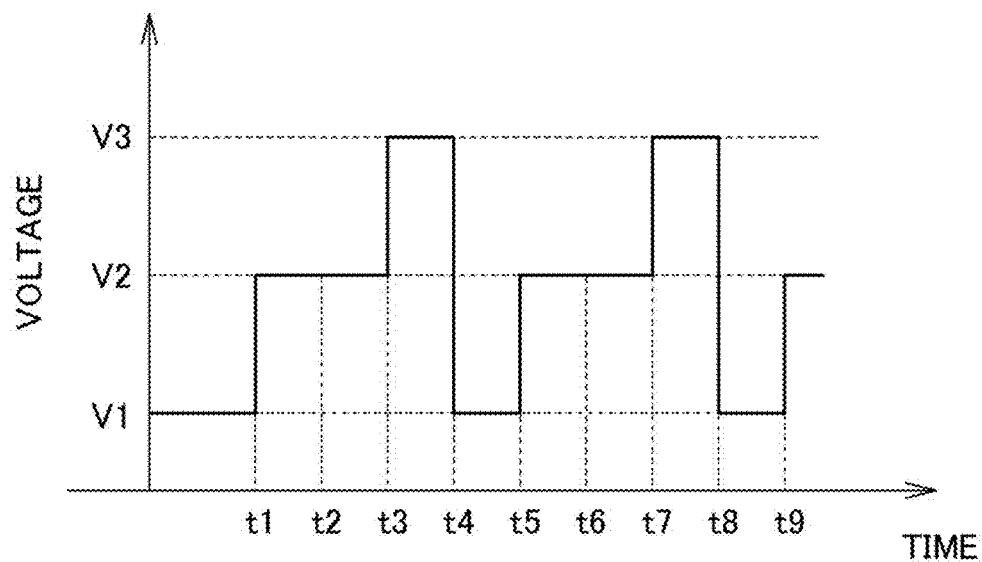
FIG. 25A is a graph showing a control method of the rhythm air shown in FIG. 24 in a case where a voltage applied to a motor takes fixed values.
Figure 25B:
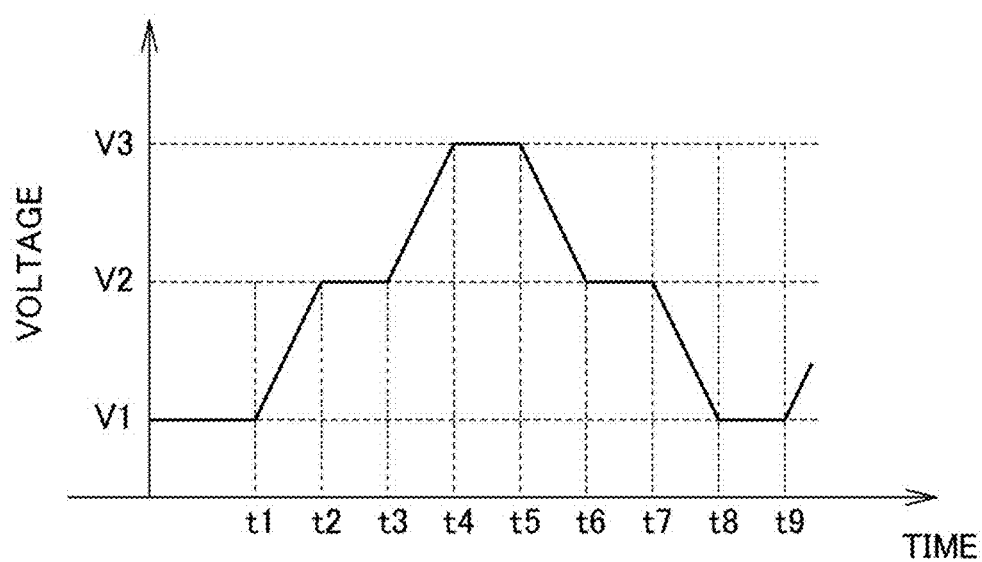
FIG. 25B is a graph showing a control method of the rhythm air shown in FIG. 24 in a case where a voltage applied to a motor is changed gradually.

FIGS. 25A and 25B are graphs showing control methods of the rhythm air shown in FIG. 24. Its horizontal axis indicates time and its vertical axis indicates a voltage applied to the motor 18. As shown in FIG. 25A, the voltage applied to the motor 18 may be kept at a constant value (V2, V2, V3, . . . ) during a unit time duration (t1-t2, t2-t3, t3-t4, . . . ). Alternatively, as shown in FIG. 25B, the voltage applied to the motor 18 may be changed gradually to change the rotational speed of the motor 18 moderately at the transition between the airflow volume rate settings. By changing the voltage applied to the motor 18 gradually, a torque applied to the fan 17 increases gradually and thereby a load applied to the motor 18 due to air resistance of the fan 17 can be decreased. In addition, by changing the rotational speed of the motor 18, i.e. the rotational speed of the fan 17, gradually, the transition of the airflow volume rate settings can be done smoothly and thereby it can be made similar to natural winds and sounds of the fan 17 at the transition of the airflow volume rate settings can be reduced.

As explained above, the controller 50 executes the control for repeating the rhythm air volume rate adjustment pattern including plural airflow volume rate settings with (irregular) combinations of the plural types of airflow volume intensities and unit seconds, so that the fluctuation effect can be generated and it can be made similar to natural winds by switching over weak wind and strong wind so as not to be simple repeats in the rhythm mode.

In addition, the controller 50 increase or decrease the voltage value of the motor 18 for driving the fan 17 gradually when controlling the rhythm air. Therefore, the transition of the airflow volume rate settings can be done moderately and thereby it can be made similar to natural winds and sounds of the fan 17 at the transition of the airflow volume rate settings can be reduced.

Modified Example

FIG. 26A is a cross-sectional view of the air passage forming member 60 included in the air circulator 1a according to the practical example 1, and FIG. 26B is a cross-sectional view of an air passage forming member 60c included in a blower according to a modified example. As shown in FIG. 26A, in the practical example 1, the fin widths W of the fins 13 in the front-rear direction are almost identical at any portion. On the other hand, as shown in FIG. 26B, in the modified example, the fin widths W of the fins 13 in the front-rear direction are differentiated such that the fin widths W gradually increases as transitioning from the outer end portions 13B to the inner end portions 13A in the fins 13 and the positions of the rear ends of all the fins 13 are located at a position of the airflow opening 11. Namely, when viewing the grill 12 from its rear side, height positions of all the fins 13 are made flat. Also according to this modified example, it can be expected similarly to the practical examples 1 and 2 that the airflow tends to be concentrated to the center of the airflow direction 4.

Other than the above example, various modification may be made in the grill 12. Namely, it is necessary that the grill 12 is provided with the plural spiral fins 13 and the inner end portions 13A closer to the center O of the spiral of the plural fins 13 are protruded in the airflow direction 4 from the outer end portions 13B made continuous to the airflow opening 11. The grill 12 that satisfies the above condition is included in the present embodiment. For example, the grill 12 may take various shape, when being viewed from its side, other than the convex shape, such as a shape including two protrusions, a truncated cone shape, a shape only whose center is concave, a stepped shape, a shape similar to a mosque of Islamic temple, a shape like Mt. Fuji.

Other Embodiments

Some embodiments are explained as described above, the descriptions and the drawings that are part of the disclosures are examples, and you should not think that they provide limitations. Based on these disclosures, various alternative embodiments, practical examples and operational technologies may be made known for person skilled in the art.

What is claimed is:

1. An air circulator comprising: a blower unit having an airflow opening on a front side of the blower unit and a grill in the airflow opening; and a support unit that supports the blower unit, wherein the grill has a plurality of airflow guide blades arranged in a spiral, and inner end portions of the airflow guide blades proximal to a center of the spiral of the plurality of airflow guide blades protrude from outer end portions of the airflow guide blades in an airflow direction, wherein the blower unit includes a cover forming an outer panel of the blower unit and an air passage forming member provided inside the cover, and wherein a reinforcing rib is formed on an outer circumferential surface of the air passage forming member;
   and an outer edge of the reinforcing rib is formed so as to contact with an inside surface of the cover.
2. The air circulator according to claim 1,
   wherein the reinforcing rib comprises a plurality of reinforcing ribs that are formed on the outer circumferential surface of the air passage forming member.
3. The air circulator according to claim 1,
   wherein a length of the air passage forming member in the airflow direction is larger than the curvature radius of the grill.

* * * * *